(12) United States Patent
Speas

(10) Patent No.: US 6,371,891 B1
(45) Date of Patent: Apr. 16, 2002

(54) ADJUSTABLE PEDAL DRIVE MECHANISM

(76) Inventor: Danny E. Speas, P.O. Box 715, Haiku, HI (US) 96708

( * ) Notice: Subject to any disclaimer, the term of this patent is extended or adjusted under 35 U.S.C. 154(b) by 0 days.

(21) Appl. No.: 09/208,276

(22) Filed: Dec. 9, 1998

(51) Int. Cl.⁷ .......................... A63B 22/06; G05G 1/14; B62M 9/00
(52) U.S. Cl. .............................. 482/57; 482/51; 482/61; 74/594.1; 280/210; 280/236
(58) Field of Search .................... 482/51, 52, 57, 482/60–63, 58, 59; 74/130, 138, 594.1, 594.2; 280/214, 210, 220, 221, 223, 236, 255, 259, 260, 261

(56) References Cited

U.S. PATENT DOCUMENTS

| | | | |
|---|---|---|---|
| 462,115 A | * 10/1891 | Eisenhart | 482/57 |
| 4,019,230 A | 4/1977 | Pollard | |
| 4,077,648 A | 3/1978 | Seul | |
| 4,159,652 A | * 7/1979 | Trammell, Jr. | 74/117 |
| 4,564,206 A | 1/1986 | Lenhardt | |
| 4,574,649 A | 3/1986 | Seol | |
| 4,961,570 A | 10/1990 | Chang | |
| 5,121,654 A | 6/1992 | Fasce | |
| 5,351,575 A | 10/1994 | Overby | |
| 5,356,356 A | * 10/1994 | Hildebrandt et al. | 482/62 |
| 6,010,433 A | * 1/2000 | Chao | 482/57 |

FOREIGN PATENT DOCUMENTS

| | | |
|---|---|---|
| CA | 923517 | 3/1973 |
| EP | 297579 | 1/1989 |
| GB | 610936 | 10/1948 |
| GB | 667655 | 3/1952 |

* cited by examiner

*Primary Examiner*—Jeanette Chapman
*Assistant Examiner*—Tami Nguyen
(74) *Attorney, Agent, or Firm*—Richard C. Litman

(57) ABSTRACT

An adjustable pedal drive mechanism for bicycles and exercise, machines includes a pedal arm attachment plate assembly on each side of the frame of the cycle or machine. Each plate assembly provides adjustment of the pivotally attached pedal arm, to alter its arcuate travel path and limits as desired. Each pedal arm includes a mechanism providing infinitesimal adjustment of the attachment point of the corresponding tension member (cable, chain, etc.) thereto, to its predetermined limits, for altering the mechanical advantage of the system. Each plate assembly also includes a mechanism for infinitesimally adjusting the effective mechanical ratio of the device to its predetermined limits, as desired. The mechanical ratios of each pedal arm are independently adjustable as desired, by remote cable controls on the handlebars of the bicycle. A separate chain or the like extends from each pedal arm and about the mechanism of each plate assembly, wrapping around a first sprocket or pulley to an idler wheel, then back about a second sprocket or pulley and back to the plate assembly. The chain, cable, etc. is reciprocated back and forth with each back or forward stroke of the corresponding pedal arm, to produce rotary force to the rear wheel with each pedal stroke. The multiple sprockets or pulleys drive one way drive mechanisms (ratchets, cam and roller, etc.) on the rear wheel hub. A stationary stand including a drag brake may be provided for a bicycle incorporating the present mechanism, allowing use of the bicycle as an exercise machine.

13 Claims, 14 Drawing Sheets

ADJUSTABLE PEDAL DRIVE MECHANISM

BACKGROUND OF THE INVENTION

1. Field of the Invention

The present invention relates generally to pedal mechanisms for powering machinery, and more specifically to an infinitely adjustable reciprocating pedal drive mechanism for powering a mobile vehicle or stationary device, such as a bicycle or exercise bicycle. The present mechanism allows the stroke of each pedal to be adjusted, as well as providing for the adjustment of the effective gear ratios of the pedal mechanism as desired. A stand for supporting a bicycle equipped with the present pedal drive mechanism, enabling the bicycle to be used as an exercise bike, is also provided.

2. Description of the Related Art

The so-called "safety bicycle," incorporating front and rear wheels of generally equal diameters and a pedal mechanism including an increase in the effective drive ratio between pedals and drive wheel, was considered a significant advance in the bicycle industry when it was developed in the late nineteenth century. This mechanism provided the speed desired, without necessitating an extremely large drive wheel with its accompanying direct pedal drive, as in the "ordinary" type of bicycle.

However, it has long been recognized that additional improvements in the pedal and chain sprocket drive mechanism of the conventional bicycle, are desirable. For one thing, the circular motion of the pedals in a conventional bicycle pedal drive mechanism are not optimally efficient for receiving power from the generally reciprocating motion provided by the legs of a rider. Another problem is the provision of finite gear ratios in such bicycles, which cannot provide optimum ratios under every circumstance. Even where those ratios are close to optimum, such geared bicycles cannot provide variable pedal positions to optimize the leg thrust or force of a rider, nor can they vary the pedal stroke in order to optimize the leg force further. This is true for both mobile bicycles and also for stationary exercise bicycles or exercise mechanisms using a pedal-like arrangement.

Accordingly, a need will be seen for an adjustable pedal mechanism for mobile and stationary vehicles, particularly for bicycles and the like. The mechanism must provide a reciprocating action for the pedals, in order to simulate more closely the natural reciprocating action of the legs of an individual while walking or running. Moreover, the mechanism must provide for the adjustment of the pedal stroke as required, as well as for positioning the mechanism at least arcuately as desired to further optimize the energy of the rider. Finally, the mechanism must also provide an infinitely adjustable ratio in order to optimize the energy of the rider even further.

A discussion of the related art of which the present inventor is aware, and its differences and distinctions from the present invention, is provided below.

U.S. Pat. No. 4,019,230 issued on Apr. 26, 1977 to Melville R. Pollard, titled "Reciprocating Powered Bicycle," describes a bicycle having conventional drive and driven sprockets with a continuously rotating chain extending therearound. However, the pedal arms are not affixed to the drive sprocket, but rather are affixed to ratchet mechanisms which in turn drive the drive sprocket in only one direction of rotation. The two pedal arms are linked together by a bellcrank mechanism, so that when one pedal is descending, the other is forced to rise. The ratchet mechanism may be locked to provide for conventional circular pedal operation, if so desired. Pollard has only a conventional Derailleur mechanism having only a finite number of ratios, unlike the infinitesimally adjustable mechanism of the present invention. Also, Pollard does not provide any means of adjusting the position of the pedal swing, due to the fixed length and location of the interconnecting bellcrank. Such pedal swing is incrementally adjustable in the present mechanism. Finally, the Pollard pedal arms pivot about the conventional sprocket hub of the bicycle, while the pivot points for the pedal arms of the present mechanism are located on pivotally adjustable plates for adjusting the pedal arm swing.

U.S. Pat. No. 4,077,648 issued on Mar. 7, 1978 to Man Taik Seul, titled "Bicycle Propulsion And Speed Change Means," describes a bicycle drive system incorporating opposite reciprocating pedal arms which pivot about a point on the rear frame essentially above the rear wheel hub. Each of the two pedal arms are connected to a drive wheel by two arms, with the length of the arms being remotely and incrementally adjustable to adjust the effective drive ratio by a series of finite increments. The drive wheel turns a sprocket, which is in turn ratcheted to impart driving force to the drive wheel of the bicycle. Seul does not provide any means of adjusting the swing arc of the pedals to a different position, nor any infinitely adjustable ratio means, as in the present drivel mechanism. Moreover, the Seul pedal arms pivot about a fixed point on the frame of the bicycle, unlike the adjustably positionable pedal arm pivot points of the present invention.

U.S. Pat. No. 4,564,206 issued on Jan. 14, 1986 to Larry, G. Lenhardt, titled "Pedal Drive," describes a mechanism having a relatively large diameter primary sprocket and a smaller diameter secondary sprocket, both rotating at the same speed. A multiple link arrangement connects the two pedal arms with the two sprockets. The resulting pedal travel path is a relatively narrow, and elongate kidney-shaped path, generally resembling a reciprocating arc. However, Lenhardt utilizes a conventional Derailleur mechanism having only a finite number of different ratios, unlike the present invention. Also, Lenhardt does not provide any means for altering the travel path of the pedals, as provided in the present invention. Moreover, while the Lenhardt pedal arms do not pivot about the sprocket hub axis, they are not adjustably positionable, as in the present invention.

U.S. Pat. No. 4,574,649 issued on Mar. 11, 1986 to Man T. Seol, titled "Propulsion And Speed Change Mechanism For Lever Propelled Bicycles," describes a rocking pedal action in which each pedal arm is connected to a relatively short length of chain which wraps about a respective sprocket disposed to that side of the drive wheel hub. Each hub contains a cam and roller one way drive device therein. The two chain lengths are connected by a cable, so that when one chain is rotating in a driving direction about its respective sprocket, the opposite chain is being pulled in the opposite direction and free wheels due to the release of the cam and roller mechanism on that side. Seol provides only incremental adjustment of the mechanical ratios of his mechanism, unlike the infinitesimal mechanical ratio adjustment of the present invention. Moreover, the arcuate motion of each pedal arm is fixed and cannot be adjusted using the Seol mechanism, whereas the present mechanism provides such adjustment as desired. The pivot axis of the pedal arms is through the original sprocket hub and is not adjustably positionable, while the pedal arm pivots are adjustably positioned away from the conventional sprocket hub in the present invention.

U.S. Pat. No. 4,961,570 issued on Oct. 9, 1990 to Chester Chang, titled "Exercising Mechanism For Simulating Climbing A Ladder," describes a device in which the two opposite pedal arms are pivotally secured at their distal ends to the frame of the machine. Relatively short cranks connecting the arms to a rotary drive wheel result in a reciprocating action of the pedal arms for rotating the wheel. A series of speed increasing gears results in the relatively high speed rotation of an output wheel, with the mechanical disadvantage provided by the speed increase resulting in a requirement for a relatively large force at each pedal in order to produce sufficient force for rotating the output wheel. Chang does not disclose any means of adjusting the arcuate pedal movement nor of adjusting the effective gear ratios, as provided by the present invention. The Chang pedal arms pivot about a fixed position on the frame of the device and cannot be adjusted, as provided by the present mechanism.

U.S. Pat. No. 5,121,654 issued on Jun. 16, 1992 to Hector G. Fasce, titled "Propulsion And Transmission Mechanism For Bicycles, Similar Vehicles And Exercise Apparatus," describes a mechanism somewhat resembling. that of the Seol '649 U.S. Pat. No. discussed further above. Fasce uses a pair of arcuate chain guides extending from each pedal, with the arcuate path of each guide increasing the length of respective chain travel as the respective pedal is reciprocated through its arc of travel. Springs urge the chain guides and pedals in an upwardly extended direction. The drive hub has two one way clutches, with each clutch freewheeling in the direction of rotation opposite the drive direction. No disclosure is made of any interconnection means between the two pedal mechanisms, nor of any ratio adjusting means or means of adjusting the path of travel of the pedals, all of which features are provided in the present invention. Moreover, the Fasce pedal arms pivot about the fixed sprocket hub of the bicycle, unlike the variably positionable pedal arm pivots of the present invention.

U.S. Pat. No. 5,351,575 issued on Oct. 4, 1994 to Nathan Overby, titled "Pumping Propulsion System," describes a pedal system using a cam and roller one way drive mechanism for each pedal, allowing each pedal to be pumped downwardly to turn the pedal sprocket. A spring is used to draw each pedal upwardly after each down stroke, with a telescoping cylinder provided as a guard over each spring. Overby notes a conventional Derailleur type gear change mechanism at the rear sprocket for his bicycle, but does not describe any form of infinitely adjustable ratios or any means of changing the pedal geometry or positioning, as provided by the present invention. The Overby pedal arms pivot about the fixed location of the original sprocket hub, unlike the variably positionable pedal arm pivot points of the present invention.

British Patent Publication No. 610,936 accepted on Oct. 22, 1948 to Mads Kruse, titled "Improvements In Or Relating To Driving Mechanism For Velocipedes," describes a reciprocating pedal arrangement, with the pedals each pulling on a chain or the like which in turn rotates a one way, cam and roller drive sprocket. The "tension member" (chain, etc.) attachment to each of the pedals is adjustable along the length of each pedal, effectively allowing for the adjustment of the "gear ratio" of the bicycle. However, no adjustment of the pedal geometry or positioning is provided by Kruse, as is provided by the present mechanism. Also, the pedal arm pivot points of the Kruse mechanism are through the fixed sprocket hub, unlike the variably positionable pedal arm pivot points of the present invention.

British Patent Publication No. 667,655 published on Mar. 5, 1952 to Andre L. Havet, titled "Hub For Bicycles Controlled Through Reciprocating Pedalling And Allowing Forward And Rearward Freewheeling," describes a one way, ratcheting type hub mechanism for bicycles. No pedal drive mechanism or adjustment therefor, or adjustable gear ratio means is disclosed by Havet, each of which features is a part of the present invention.

Canadian Patent Publication No. 923,517 issued on Mar. 27, 1973 to George Kay et al., titled "Exercising Machine," describes a device having reciprocating foot pedals and cable mechanisms for pulling with the hands and arms. The pedal pivot points are at a fixed location, unlike the adjustable pivot points of the present mechanism, and no adjustable gear ratio means is provided by Kay et al. with their mechanism, as provided in the present invention. Also, Kay et al. do not provide any means of securing a bicycle incorporating an adjustable pedal drive mechanism to their exercise machine, as provided by an embodiment of the present invention.

Finally, European Patent Publication No. 297,579 published on Jan. 4, 1989 to Georg Felkel illustrates a pedal powered drive mechanism for a vehicle. The system appears to use a one way drive (ratchet, etc.) and reciprocates a chain about the drive sprocket by means of a multiple pulley or sprocket system, similar to that used in a block and tackle. No adjustable pedal pivot points or variable gear ratios are apparent in the Felkel disclosure.

None of the above inventions and patents, either singly or in combination, is seen to describe the instant invention as claimed.

SUMMARY OF THE INVENTION

The present invention comprises an adjustable pedal drive mechanism for use with bicycles, exercise machines, and other vehicles and devices which may be pedal powered. A stand for using a bicycle equipped with the present pedal mechanism as an exercise machine, is also disclosed. The present pedal mechanism essentially comprises a pair of plates which are pivotally secured through a lateral passage affixed to the diagonal frame member (which may also comprise a seat post support for the cycle or device) approximately midway therealong, with a relatively long pedal arm pivotally mounted to each of the plates. Each plate is adjustable relative to the frame of the bicycle, to allow the pedal swing, geometry, or travel arc or range to be adjusted as desired.

Each pedal arm includes means for infinitesimally adjusting the attachment point of a chain, cable, or the like thereto, for adjusting the effective mechanical ratio of the mechanism. Each of these tension members (chain, cable, etc.) passes about another mechanical ratio adjusting device secured to each of the plates, thence continuing to the rear wheel drive sprocket of the bicycle. An idler pulley is provided for each tension member to reverse its relative direction of motion according to pedal arm movement. The rear wheel sprocket includes two one way clutch mechanisms on each side, thus producing a rotational force to the rear wheel in only a forward rotational direction with both directions of travel of each arcuately reciprocating pedal arm. These one way clutches may be ratchets, cam and roller mechanisms, etc., as desired.

Accordingly, it is a principal object of the invention to provide an improved adjustable pedal drive mechanism for pedal powered devices, including bicycles and exercise machines.

It is another object of the invention to provide an improved pedal mechanism for such devices, which mechanism provides means for collectively adjusting the pivot point and travel path of the pedals of the mechanism as desired.

It is a further object of the invention to provide an improved pedal mechanism including means for infinitely adjusting the effective mechanical ratio of the device through a predetermined range of mechanical ratios, as desired.

An additional object of the invention is to provide an improved pedal mechanism including means for independently adjusting the effective ratio of each of the pedals and pedal arms independently of the other, as desired.

Still another object of the invention is to provide an improved pedal mechanism providing for the adjustment of effective ratios as desired, while the mechanism is in motion.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention comprises improvements in a pedal mechanism for pedal powered devices, such as a bicycle or the like, although the present invention could be applied to cycle cars, pedal powered exercise devices, and other pedal powered mechanisms as desired. The present mechanism provides significant advances in the adjustability and power transmission efficiency by a user of the device, thereby providing greater efficiency for a bicycle or, other pedal powered device which is equipped with the present mechanism. A stationary stand may also be provided for holding a bicycle equipped with the present mechanism, for using the bicycle as an exercise machine as desired.

Figure 1:
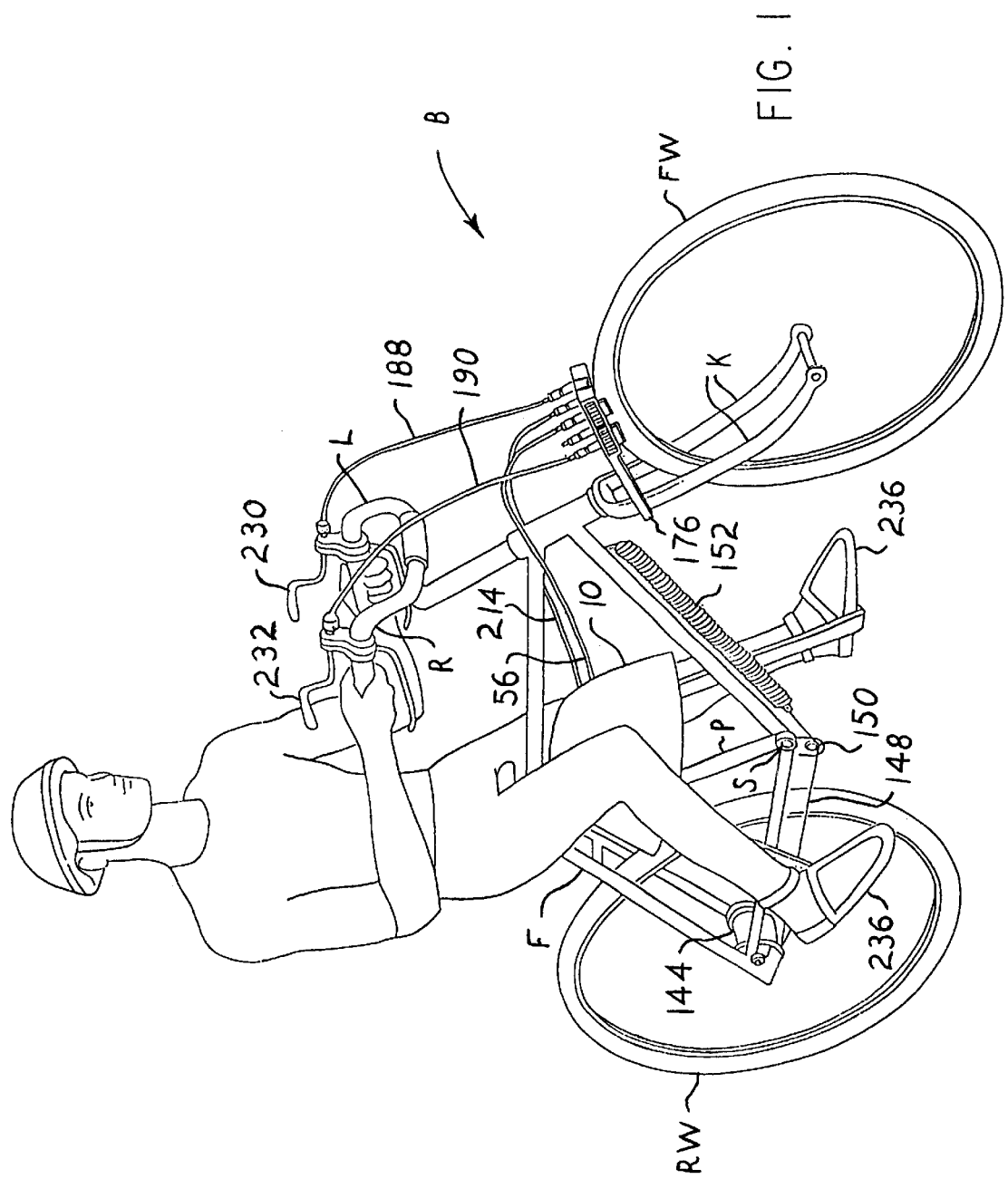
FIG. 1 is an environmental perspective view of a bicycle and rider using the present adjustable pedal drive mechanism.

FIG. 1 provides a general perspective view of a bicycle B equipped with the present mechanism. The bicycle B will be seen to be generally conventional, having a generally trapezoidal frame F with a diagonal frame member P which may extend generally upwardly to support the seat. The device to which the present invention is applied includes at least one forward wheel FW which is mounted between a pair of front forks K, a rearwardly disposed drive wheel RW, a left and opposite right handlebar, respectively L and R, communicating with the steerable forward wheel FW, and a pedal shaft bushing or sleeve S laterally disposed at or near the base of the seat post frame member P. The above description applies to a conventional bicycle, but it will be seen that additional wheels could be provided to form a cycle car or tricycle, or some other form of pedal powered vehicle or device having a similar structure.

It will be seen that various relatively minor modifications have been made to the bicycle B of FIG. 1, in order to, accommodate the present invention therewith. For example, it will be noted that the conventional pedal mechanism has been removed from the pedal shaft bushing S of the bicycle B of FIG. 1, as it is no longer needed for propelling the bicycle B equipped with the, present adjustable pedal drive mechanism. Other modifications and attachments have also been provided, as described further below.

Figure 2:
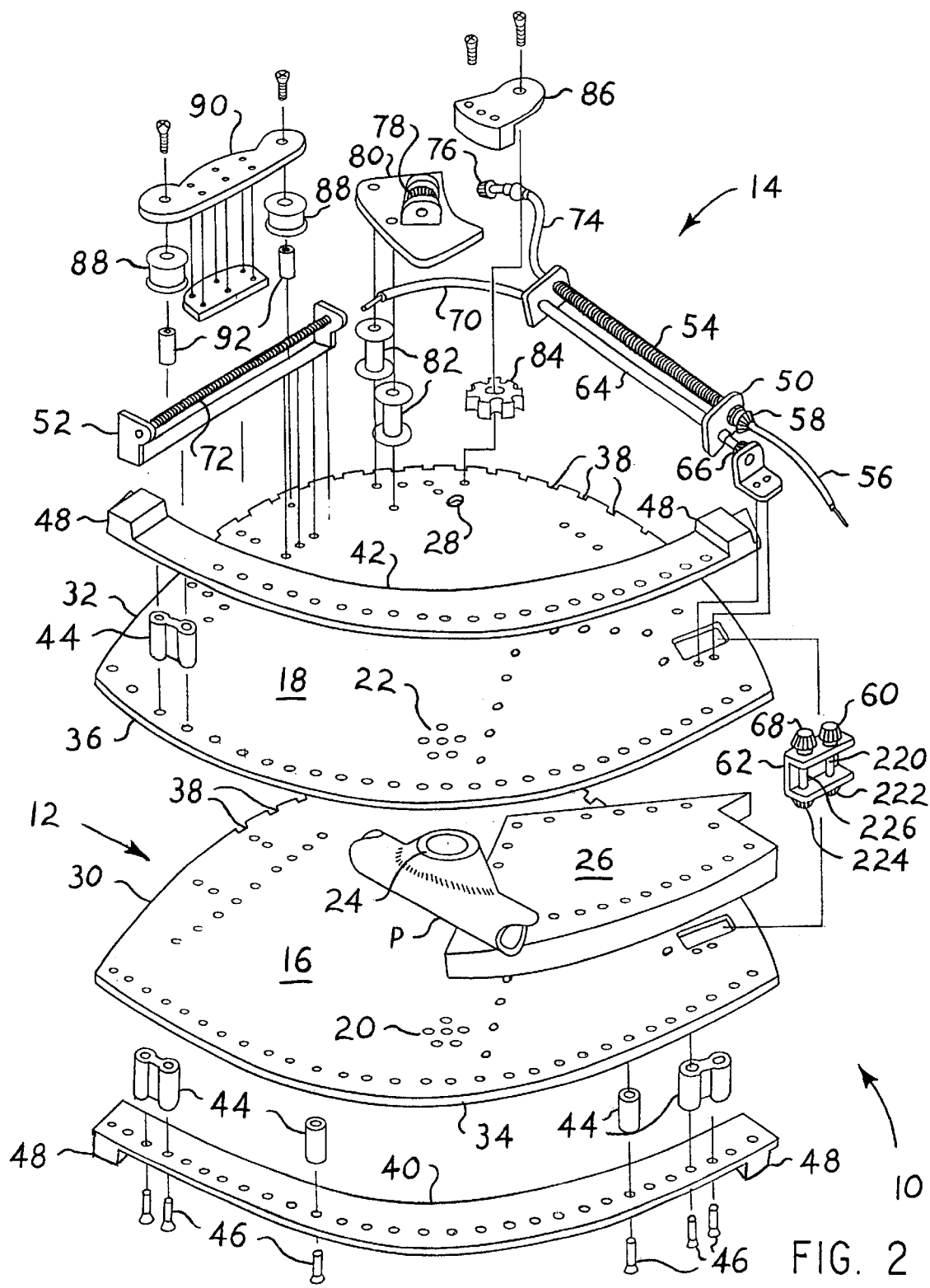
FIG. 2 is an exploded perspective view of the pedal adjustment plate assembly of the present mechanism, showing details of its various components.

FIG. 2 provides an exploded perspective view of the pedal arm attachment assembly 10 of the present adjustable pedal drive mechanism. The assembly 10 may also be seen generally in FIG. 1, installed on the bicycle B. The assembly 10 essentially comprises a first or left pedal arm plate assembly 12 and opposite right plate assembly 14. It will be seen that these two plate assemblies 12 and 14 are mirror image structures. The two plate assemblies 12 and 14 each include a plate, respectively 16 and 18, each having a, respective attachment point 20 and 22 comprising a plurality of screw or bolt attachment holes or passages. The plates 16 and 18 of the two assemblies 12 and 14 are pivotally secured to a pedal arm plate attachment boss (not shown) which resides in the bushing 24, by means of the attachment points 20 and 22 and a plurality of conventional screws or bolts (not shown), with the bushing 24 in turn being solidly affixed (welded, etc.) laterally across the diagonal frame member P between the seat end and opposite pedal shaft bushing S. A spacer 26 is affixed between the two plates 16 and 18 to affix them rigidly together relative to one another.

Each of the plates 16 and 18 includes a pedal arm attachment, point, with the right side pedal arm attachment point 28 beings shown in FIG. 2 and the left plate pedal arm attachment point being concealed in the exploded perspective view. These pedal arm attachment-points are located generally opposite their respective attachment points 20 and 22 to the bushing or sleeve 24 of the diagonal member P of the cycle frame F. The two plates 16 and 18 are each defined by opposite arcuate edges, with first or upper arcuate edges, respectively 30 and 32, defined by the respective pivot points 20 and 22 of the two plates 16 and 18 and the opposite, second or lower edges, respectively 34 and 36, defined by the respective pedal arm attachment points (e.g., the pedal arm attachment point 28 shown in the right side plate 18).

The upper edges 30 and 32 each include a plurality of notches, 38 formed therein, for the purpose of locking the position of the plate assembly 10 as desired for adjusting the position of the pedal arc, as will be explained further below. The opposite lower edges 34 and 36 each have a pedal arm guide retainer, respectively 40 and 42, secured thereto. These retainers 40 and 42 are secured to the respective plate lower edges 34 and 36 by a plurality of spacers 44 and screws 46 (with only a few of the spacers and screws being shown, for clarity in the drawings). Pedal arm guides for each of the pedal arms ride in the gap between each plate lower edge 34 and 36 and their corresponding arcuate retainer 40 and 42, as will be explained further below. A pedal arm bumper or stop 48 is located at each end of each retainer, to the outer portion thereof.

FIG. 2 also illustrates the adjusters providing for adjustment of the effective mechanical ratios of the forward and rearward strokes of the pedal arms of the present mechanism. While only the adjusting means for the right side assembly 14 is shown in FIG. 2, it will be understood that mirror image mechanisms are provided for the left side assembly 12. A first adjuster assembly, 50 is affixed adjacent the forwardmost or uppermost portion (depending upon the arcuate adjustment of the assembly) of the arcuate edge 32 (and 30, in the case of the left side plate 16), with a second adjuster assembly 52 being located adjacent the rearwardmost or lowermost portion of the edge 32 (and 30). Each adjuster assembly 50 and 52 provides for the linear positional adjustment of a tension member (chain, cable, etc.) attached thereto, shown in other Figures and discussed in detail further below. These adjusters 50 and 52 provide for the infinitesimal adjustment of the effective mechanical ratio respectively of the rearward and forward pedal arm strokes of the present mechanism due to their threaded configuration, through predetermined ranges.

The first adjuster assembly 50 includes a threaded shaft 54, which is rotated by a cable 56. The cable 56 is driven by a mechanism communicating with the forward wheel or tire FW of the, pedal driven device B, explained in detail further below. A first adjuster bevel gear 58 engages a transfer bevel gear 60 which transmits rotary motion to the opposite side of the pedal arm attachment assembly 10 by means of the transfer gear assembly 62, to drive the opposite first adjuster assembly of the left plate 16.

A transfer shaft 64 is also contained in the first adjuster assembly 50, and rotates independently of the threaded adjuster shaft 54 of that assembly 50. The transfer shaft 64 receives its rotational input through a transfer shaft bevel gear 66 from a second transfer bevel gear 68 of the transfer gear assembly 62, which in turn receives. rotational energy from a second flexible drive cable to the left plate assembly 12. (The second cable is not shown in FIG. 2, but is of the same configuration as the cable 56.) The transfer shaft 64 in turn rotates a transfer cable 70 connected to the threaded adjuster shaft 72 of the second adjuster assembly 52, causing the adjuster shaft 72 to rotate according to rotary input from the opposite side mechanism through the transfer mechanism including second transfer bevel gears 66 and 68, transfer shaft 64, and transfer cable 70.

Figure 3:
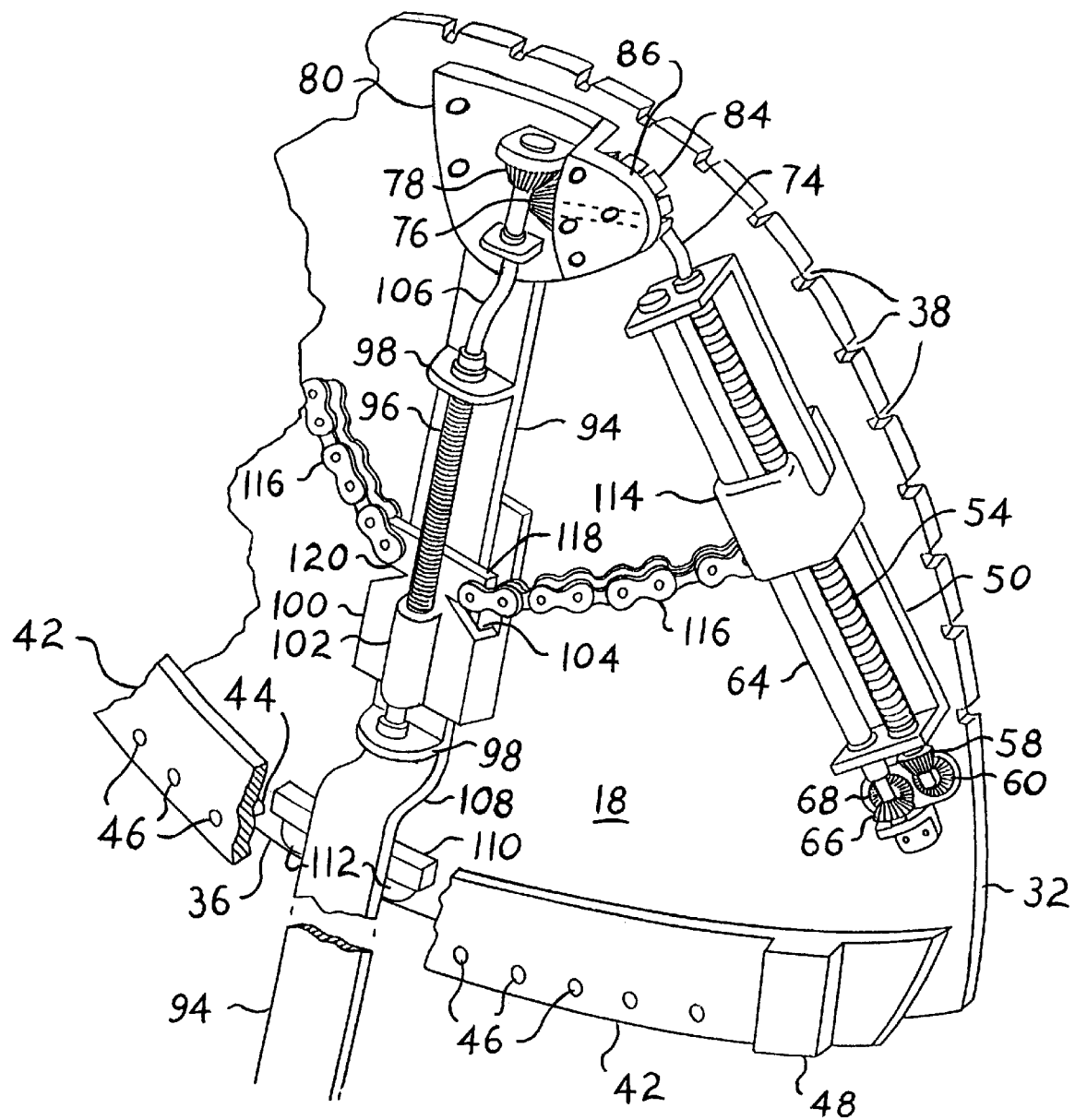
FIG. 3 is a broken away perspective view of the right side of the plate assembly of FIG. 2, with the corresponding right side pedal arm pivotally secured thereto, showing details of the assembly.

FIG. 2 also illustrates a further mechanical ratio adjuster means providing for infinitesimal adjustment of a third adjuster, located on the pedal arm and shown in detail in FIG. 3. (As in the case of the unseen left side adjusters of FIG. 2, each of the pedal arms includes such an adjuster and adjusting means, as in the right side assembly shown in FIG. 2.) The pedal arm adjusting means receives rotational input from the first adjuster screw shaft 54, by means of a transfer cable 74. This transfer cable 74 has an output bevel gear 76, which imparts rotational motion to a pedal adjuster bevel gear 78, secured to a plate 80. The plate 80 is spaced away from the main plate 18 by spacers 82, to provide space for the attachment end of the pedal arm at its attachment point 28.

The pedal arm assembly, shown in FIG. 3 and discussed further below, includes a mechanical ratio adjuster which is connected to a flexible tension member (roller chain, cable, etc.) which is in turn connected to adjuster assemblies adjustably positioned on each of the adjusters 50 and 52, one of which is shown in FIG. 3. The tension member in turn passes over a guide sprocket or roller 84 adjacent the attachment point 28 for the pedal arm, with the sprocket or roller 84 being secured in place by a retainer 86 secured to the plate 18 adjacent the bevel gear plate 80 (with a like assembly secured to the opposite left side plate 16). The tension member extends essentially about a portion of the upper arcuate edge 32 of the plate 18, and is guided by a pair of generally peripheral rollers 88, which are retained by a plate 90. Spacers 92 are provided for the rollers 88 in order to position them coplanar with the tension member.

FIG. 3 provides a somewhat simplified detail assembly view of a portion of the right side pedal arm attachment plate assembly 14, with the right side pedal arm retainer 42, first adjuster assembly 50, adjuster slide, right side pedal arm, pedal adjuster gear 78 and attachment plate 80, guide roller or sprocket 84 and retainer 86, and a portion of the flexible tension member (e.g., roller chain) secured thereto. Drive cable 56 for the first adjuster assembly 50 and the transfer cable 70 from the transfer, shaft of the first adjuster assembly 50 are not shown in FIG. 3, for clarity in the drawing Figure. The left side assembly is a mirror image of the adjuster assembly 50 shown in FIG. 3.

Each pedal arm is pivotally secured to its respective pedal arm attachment point, e.g., the right side arm 94 is secured to the right side pedal arm attachment point 28 (shown in FIG. 2). Each pedal arm comprises an elongate component having an attachment end and a distal pedal end. The upper portion, near the pivotal attachment end, includes means for infinitesimally adjusting the effective mechanical ratio or length of the pedal arm. This adjusting means comprises a selectively rotatable-threaded shaft 96 captured on each of the pedal arms and generally parallel thereto, e.g., the right pedal arm 94 shown in FIG. 3, with each shaft 96 being captured by opposite lugs or ears 98 at each end thereof.

An adjuster slide 100 is secured about the pedal arm 94 so that it may slidably move upwardly and downwardly along the length of the pedal arm 94 between the two threaded shaft lugs 98. The slide 100 has an internally threaded portion 102 cooperating with the threads of the threaded shaft 96, thereby causing the slide 100, to travel upwardly or downwardly along the upper portion of the pedal arm 94 when the threaded pedal arm shaft 96 is rotated. However, the slide 100 has an internal passage 104 configured to fit closely about the shape of the upper portion of the pedal arm 94, to preclude rotation of the slide 100 relative to the pedal arm 94. When the threaded shaft 54 of the first adjuster assembly 50 is rotated, the corresponding rotation of the transfer cable 74, output gear 76, and pedal adjuster gear 78 cause the pedal adjuster cable 106 to rotate, thus rotating the threaded pedal shaft 96 as desired to move the adjuster slide 100 on the pedal arm.

Each of the pedal arms is secured to the lower arcuate edge of its corresponding plate by the corresponding pedal arm retainer, as described below for the right side pedal arm 94. The pedal arm 94 includes an outwardly formed offset 108, for providing clearance to the outside of the pedal arm retainer 42. A short crossmember 110 is affixed to the pedal arm 94 immediately below this offset portion 108, and rides within the space defined by the retainer 42 and the immediately underlying portion of the plate 18, adjacent its lower arcuate edge 36. A forward and a rearward roller 112 extend from the crossmember 110, and fit closely within the space between the retainer 42 and plate 18 to preclude lateral play between the pedal arm 94 and the retainer 42 and plate 18, yet allow the pedal arm 94 to move smoothly in its reciprocating arcuate travel path along the lower edge 36 of the plate 18.

Figure 5:
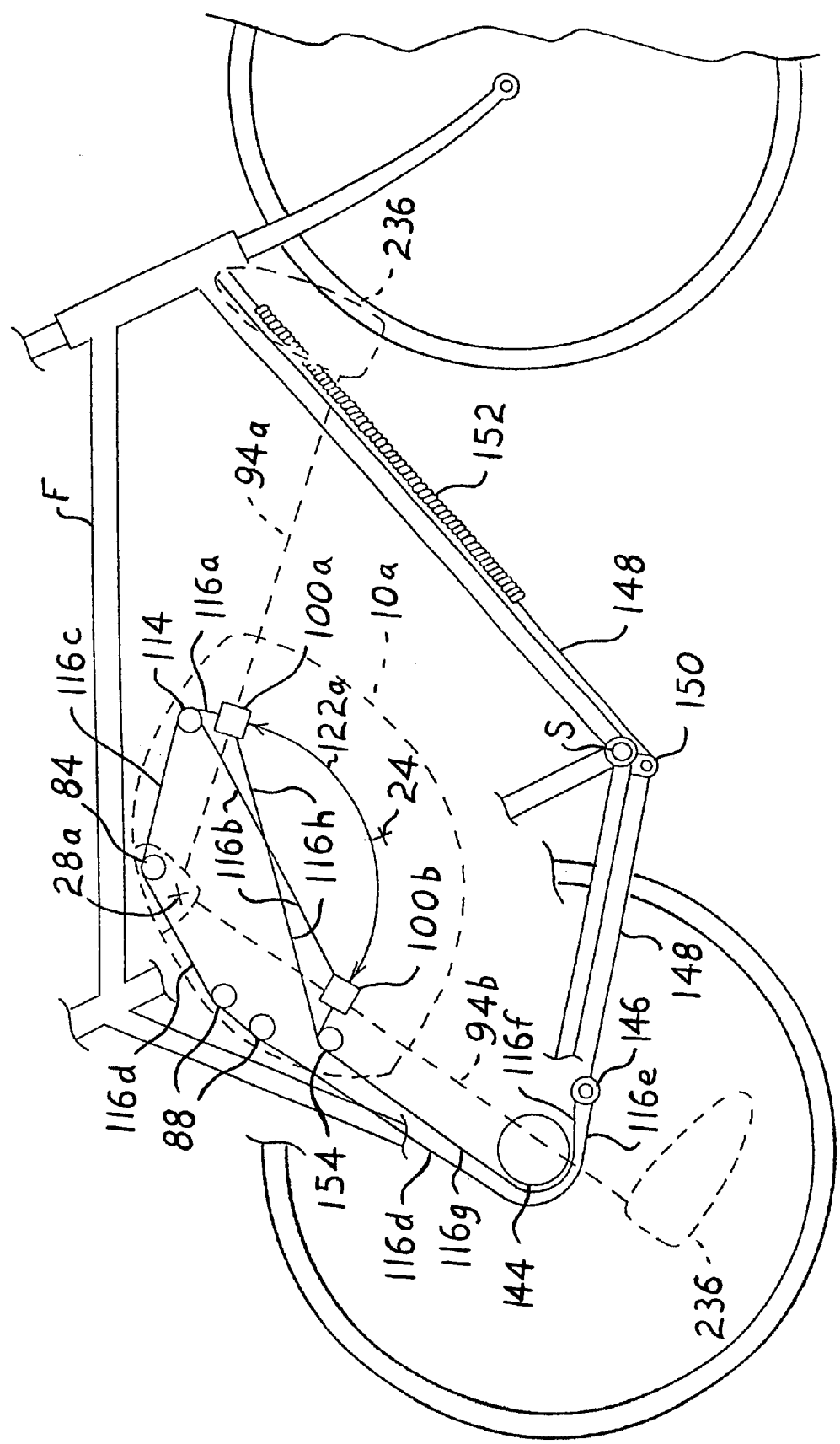
FIG. 5 is a right side schematic view, showing the chain or, cable linkage and travel for corresponding right pedal arm travel with the pedal arm attachment plate pivotally adjusted to its lowermost arcuate position.
Figure 6:
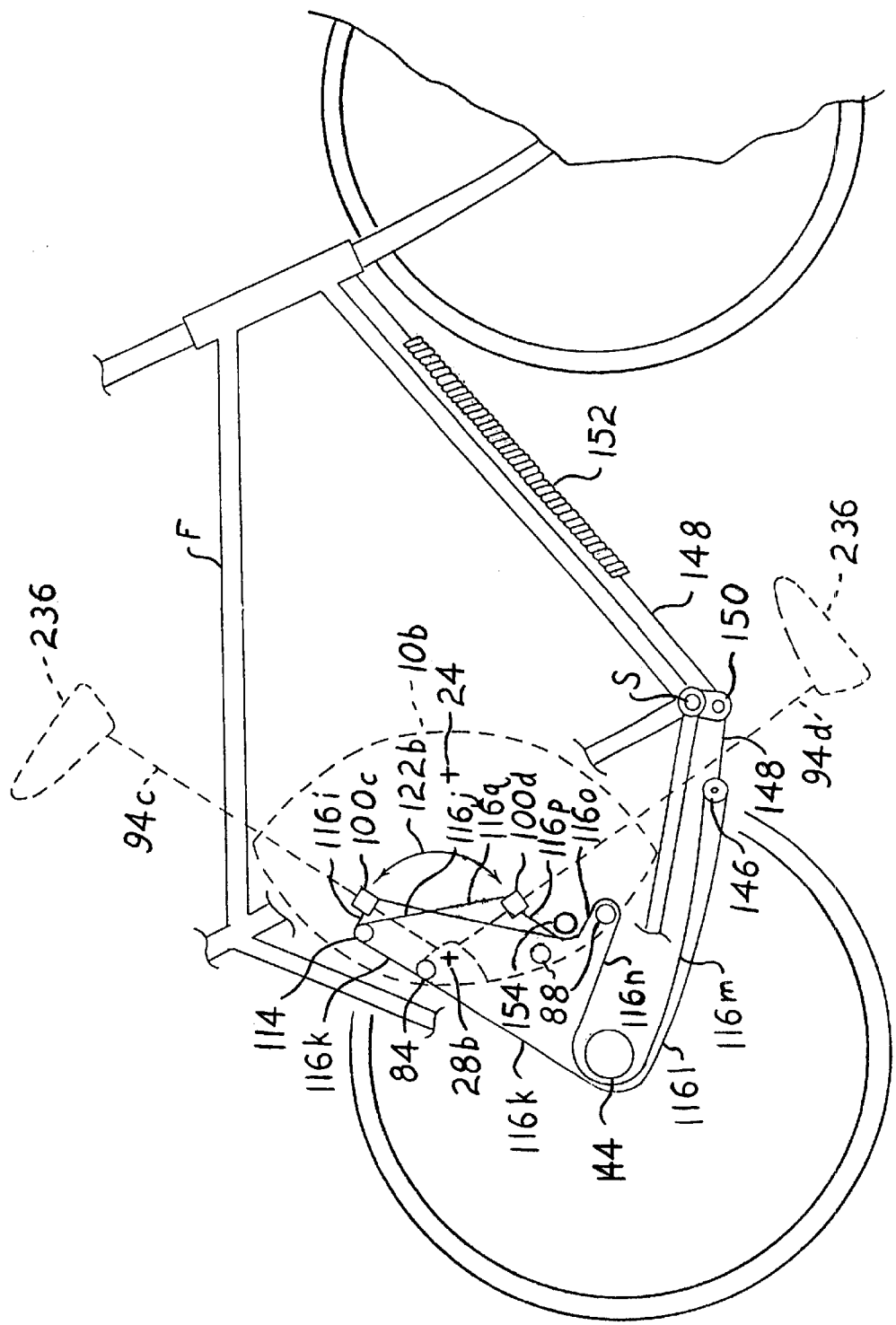
FIG. 6 is a right side schematic view, showing the chain or cable linkage and travel for corresponding right pedal arm travel with the pedal arm attachment plate pivotally adjusted to its forwardmost or uppermost arcuate position.

A first adjuster slide 114 configured similarly to the pedal arm slide 100 is slidingly secured to the first adjuster assembly 50, and is adjustably positioned along the assembly 50 by the threaded first adjuster shaft 54, similarly to the adjustment of the pedal arm slide 100 described further above. An elongate, flexible tension member 116 (e.g., the roller chain shown in FIG. 3, but alternately flexible cable, etc.) is secured to a first attachment ear or lug 118 of the pedal arm adjuster slide 100, and extends about the plate assembly 14 components and rear wheel drive sprocket of the machine, returning to a second attachment lug 120 of the slide 100. The complete path of the tension member 116 is illustrated in FIGS. 5 and 6, and described in detail further below.

As noted further above, the pedal arm attachment assembly 10 is arcuately adjustable relative to the frame F of the bicycle B, about the plate assembly attachment bushing 24 and bearing therein (not shown). The left and right pedal arms each pivot about their respective attachment points on their respective pedal arm plate assemblies, e.g., the right side pedal arm 94 is pivotally secured to the right side plate assembly 14 at the pedal arm attachment point 28, as described further above. Each pedal arm may thus swing through an arc having its end points defined by the respective forward and rearward pedal arm stops 48 of the respective pedal arm track 40 or 42. Accordingly, it will be seen that the repositioning of the pedal arm plate assembly 10 serves to provide different pedal arm travel arcs relative to the bicycle frame F, depending upon the position of the plate assembly 10. This repositioning of the plate assembly 10 results in the repositioning of the pedal arm attachment points relative to the bicycle frame F, e.g., the right pedal arm attachment point 28, due to its different location from the plate attachment points 20 and 22 about which the two plates pivot adjustably relative to the frame F, to accomplish the adjustment of the pedal arm travel arcs.

Figure 4:
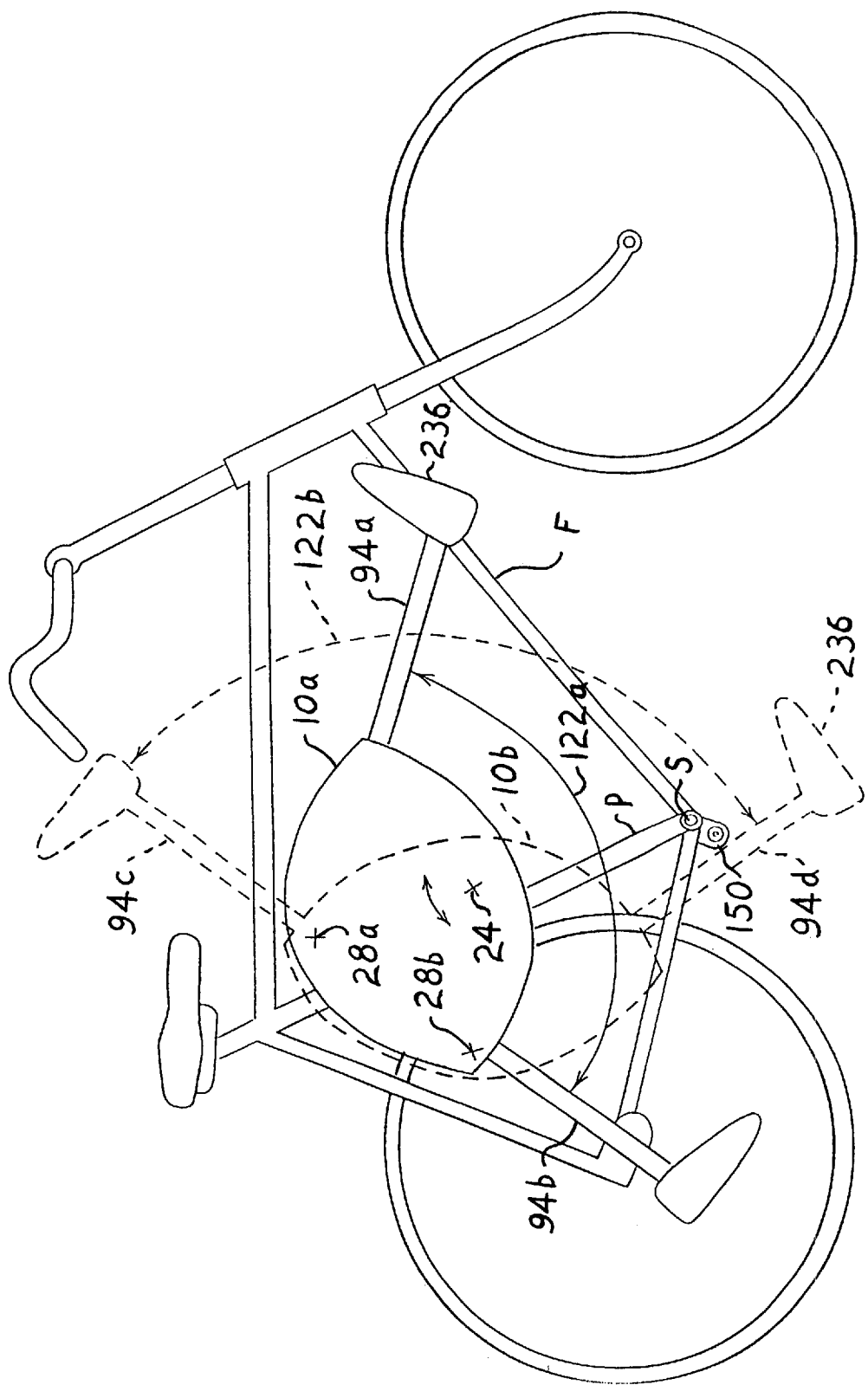
FIG. 4 is a schematic view of the right side of a bicycle with the present mechanism, showing the adjustability of the pedal pivot points and corresponding pedal swing or travel.

FIG. 4 provides a schematic right side elevation view of the adjustment range of the plate assembly and pedal arm travel arcs relative to the bicycle frame F. A first position shows the pedal arm attachment plate assembly in solid lines, with this position being designated as plate assembly 10a. An alternative second position for the plate assembly is shown in broken lines, with the broken line position being designated as assembly 10b. The plate assembly 10a, 10b is pivotally secured to the bicycle frame F at the pedal arm assembly attachment bushing 24 which is in turn affixed to the seat post member P, with the bushing 24 being indicated schematically by the designated center mark in FIG. 4.

As the pedal arm assembly is shifted from its first position 10a to its second position 10b, it will be seen that the separate pedal arm attachment points are also shifted arcuately about the plate attachment point 24. The first pedal arm attachment point corresponds to the first plate position 10a and is designated as point 28a, with the second pedal arm attachment point corresponding to the second plate position 10b being designated as 28b. The first plate position 10a shown is generally at or near one limit of adjustment of the plate assembly, and provides a pedal arm arc 122a limited by the corresponding pedal arm stops 48 (FIG. 2), with the corresponding pedal arm arcuate limits being designated by pedal arms 94a and 94b in FIG. 4.

The opposite adjustment position, represented by plate position 10b, is generally at or near the opposite limit of positional adjustment for the plate assembly. This plate position 10b provides a pedal arm arc 122b, with the limits of the arc 122b again being set by the stops 48. The corresponding pedal arm arcuate limits are designated by pedal arms 94c and 94d, shown in broken lines.

As the center of each arc 122a and 122b is generally defined by a line extending from its respective pedal arm pivot point 28a or 28b and the plate attachment point 24, it will be seen that the first arc 122a is disposed generally downwardly from the pedal arm attachment point 28a (and plate attachment point 24), while the second arc 122b is disposed generally forwardly of the pedal arm attachment point 28a and plate attachment point 24. Thus, the operator of the present mechanism may select either of the above plate adjustment positions 10a or 10b, or any position therebetween as desired, in order to adjust the pedal arm travel range as desired. It will be understood that the positions shown, particularly the second plate position 10b, represent extremes which may not be used, but the present mechanism is capable of providing such extreme limits, if the operator so desires.

Figure 8:
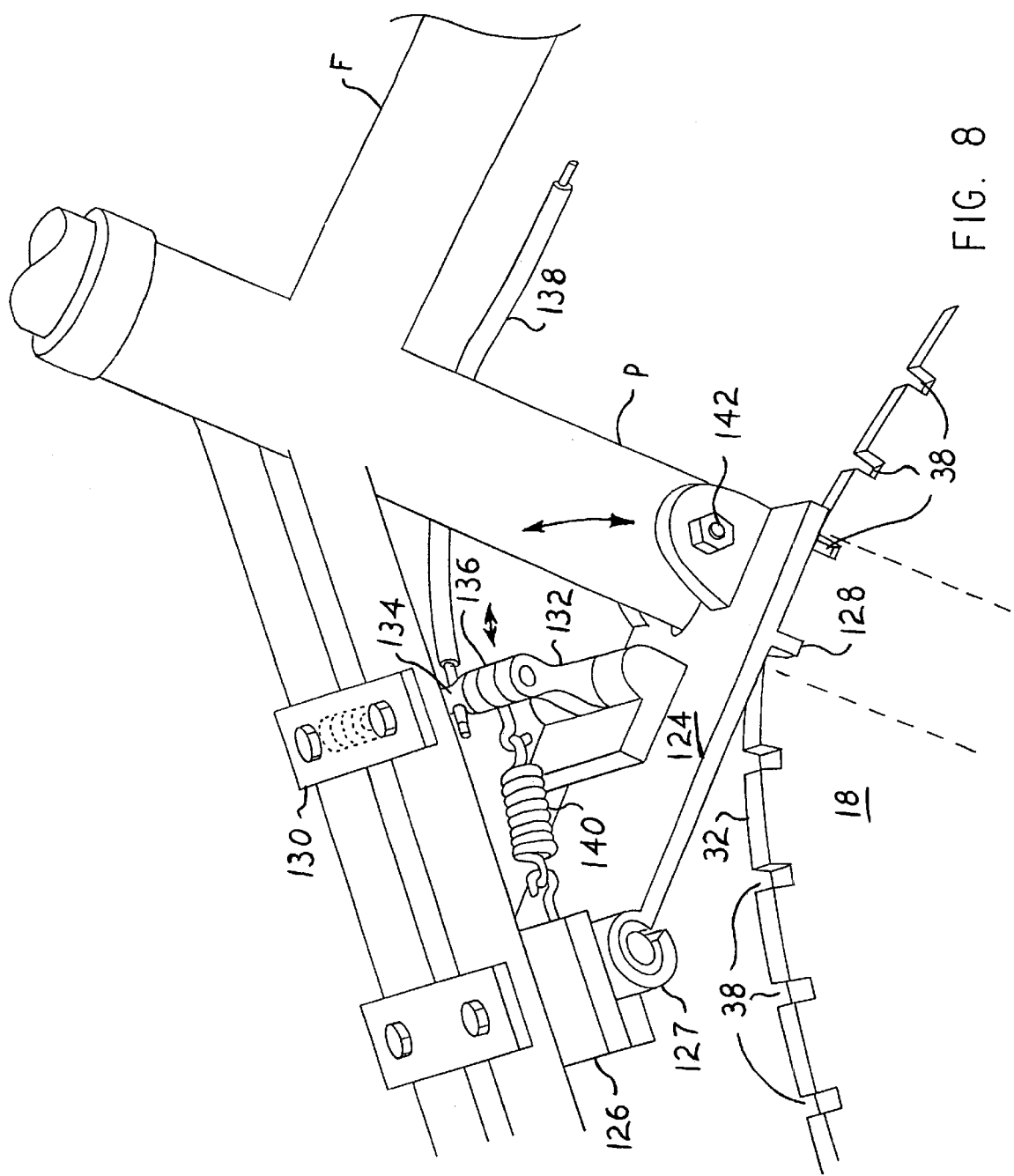
FIG. 8 is a broken away perspective view of a portion of the bicycle frame, showing details of the means for adjustably locking the pivotal positions of the pedal arm attachment plates thereto.

Some means must be provided for locking or securing the plate assembly 10 at the desired position during operation. FIG. 8 illustrates a broken away detailed perspective view of the latching means used to secure the plate assembly 10 in the desired position. A latch plate 124 is hingedly secured to an attachment member 126, which is in turn affixed to the upper rear frame members which straddle the rear wheel on a conventional bicycle. The latch plate 124 includes a latch bar 128 extending laterally thereacross and thereunder, with the latch bar 128 serving to selectively engage a corresponding pair of notches 38 formed in the upper edges 30, 32 of the two pedal arm plates 16 and 18. (The left side pedal arm plate 16 is omitted in FIG. 8, for clarity in the drawing.)

The latch plate 124 is actuated by an arm and knuckle assembly which is also secured to the upper rear frame members by an attachment 130. The arm and knuckle assembly comprises a lower arm 132 and upper arm 134, secured to one another at a point generally intermediate the attachment 130 and latch plate 124 by a knuckle or hinge 136. A remote actuation cable 138 is used to fold the two arms 132 and 134 at the knuckle 136, thus lifting the latch plate 124 about its pivotal attachment to the hinge 127 of the attachment member 126. The cable 138 may extend to an actuating handle (not shown), e.g., a conventional brake lever handle or the like, at either of the handlebars L or R of the cycle B. Actuation of the handle pulls the cable 138, thus lifting the latch plate 124 to adjust the position of the two pedal arm attachment plates 16 and 18 relative to the frame F of the pedal powered device, as desired.

A tension spring 140 is used to bias the arm assembly to an extended position, thus holding the latch bar 128 in a normally locked position across a pair of the notches 38 of the two plates 16 and 18, until the cable 138 is pulled to lift the latch plate 124. The latch bar 128 may include cooperating notches (not shown) which grip the sides of each plate 16 and 18, to preclude lateral play between the plates 16, 18 and the latch plate 124. Threaded side clearance adjusters, e.g., adjuster 142 shown on the right side of the seat post member P in FIG. 8, are provided through extensions of the latch plate 124 and fit closely about the seat post member P to reduce or preclude lateral play in the mechanism comprising the latch plate assembly and the two plates 16 and 18.

The above described pedal arm travel arc adjustment provided by selectively adjusting the position of the plate assembly 10 as described above, is operational regardless of any specific settings of the adjuster slides 100 of the pedal arm, 114 of the first adjuster assembly 50, and the adjuster slide (not shown) for the second adjuster assembly 52. FIGS. 5 and 6 schematically illustrate the routing of the tension member (chain, cable, etc.) for a downwardly and rearwardly positioned plate assembly 10 and relatively low mechanical ratio for relatively higher speeds (FIG. 5), and tension member routing for a forwardly positioned plate assembly 10 having a relatively high ratio for the pedal adjuster and first adjuster, and relatively low ratio for the second adjuster (FIG. 6). It will be understood that the schematic routings and ratios indicated in FIGS. 5 and 6 are exemplary, and that a practically infinite variety of ratios may be provided by the present device with its infinitesimal adjustments.

In FIG. 5, the plate assembly shown in broken lines is oriented generally in the manner of the plate assembly 10a of FIG. 4, and is designated by the same reference character 10a. The tension member (chain, cable, etc.), generally indicated by the reference character 116, extends forwardly and rearwardly from its attachment to the pedal arm adjuster, which is shown in two different positions 100a (for the forwardmost pedal arm position 94a) and 10b (for the rearwardmost pedal arm position 94b). Different segments of the tension member are indicated by different alphabetic subcharacters for the basic tension member 116.

The tension member portion extending forwardly from the pedal arm adjuster 100, passes through the first adjuster slide 114 and wraps about a sprocket or pulley installed therein, indicated by the circular shape for the adjuster 114 shown schematically in FIG. 5. It will be seen that the path of the tension member will vary in its run from the adjuster 100 to the first adjuster slide 114, depending upon the position of the pedal arm 94 and pedal arm slide 100. In FIG. 5, the tension member run from the forwardmost position 100a of the pedal arm adjuster to the first adjuster slide pulley 114 is indicated as tension member segment 116a, with the segment running from the rearwardmost position 100b of the pedal arm adjuster to the first adjuster pulley 114 being indicated as segment 116b. As the pedal arm swings arcuately back and forth between positions 94a and 94b, the tension member segments 116a and 116b will vary in length and angle accordingly.

Figure 7:
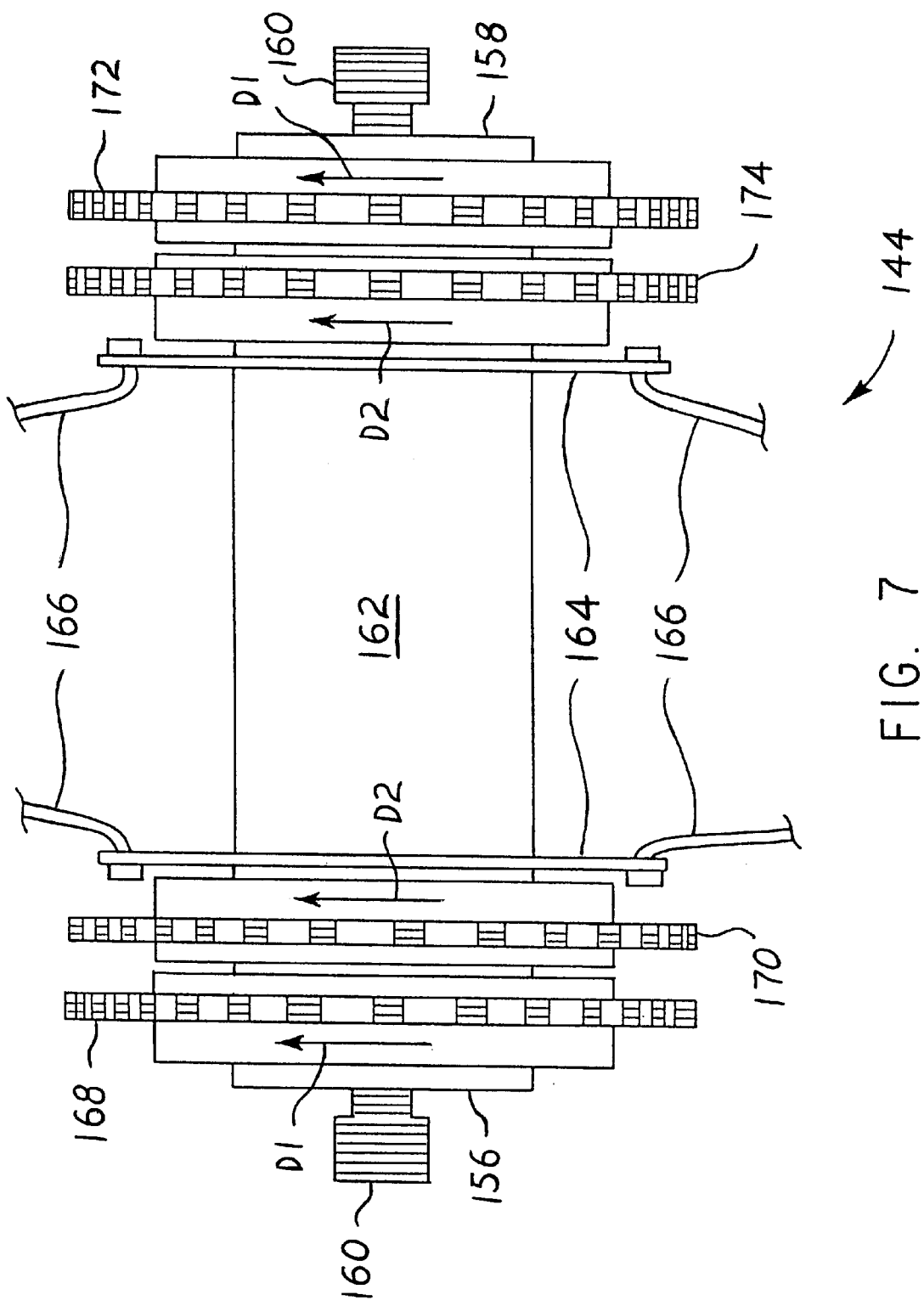
FIG. 7 is a rear elevation view of the multiple sprocket, one way drive rear wheel hub of the present mechanism.

From the first adjuster 114 and its pulley, the tension member continues to the sprocket or roller 84 adjacent the pedal arm pivot attachment point 28a, with this segment being designated as 116c. After passing around the pulley or sprocket 84, the tension member continues generally about the upper rear periphery of the plate assembly 10a, and over the two peripheral guide rollers 88. This segment of the tension member is indicated as 116d. After passing over the peripheral guide rollers 88, the tension member segment 116d continues generally downwardly, to wrap around a first sprocket of the rear wheel hub 144. The hub assembly 144 is shown in FIG. 7 and discussed in detail further below.

After passing around the first sprocket (or roller, in the case of a flexible cable tension member), the tension member continues forwardly to an idler pulley 146, with the tension member segment between the hub 144 first sprocket and the idler pulley 146 designated as segment 116e. The idler pulley 146 is positioned by a cable 148 or the like which passes about a guide pulley 150 beneath the pedal shaft bushing or sleeve S of the frame F, and forwardly to a tension member adjuster spring 152. This spring 152 serves to maintain tension on the tension member throughout its run, to maintain engagement with the sprocket teeth (in the case of roller chain). Alternatively, a flexible cable tension member may include multiple wraps about respective pulleys or rollers at the rear wheel hub 144 with a central wrap being anchored to the corresponding roller, to provide the required rotation of components by means of generally linear motion of the cable.

The tension member generally reverses its direction after passing around the idler pulley 146, with the tension member segment 116f extending from the pulley 146 back to a second sprocket or roller of the rear wheel hub assembly 144. After wrapping or passing about the second sprocket or roller of the hub assembly 144, the tension member segment 116g extends generally upwardly to the second ratio adjuster slide and pulley or sprocket 154, essentially the same as the slide 114 of FIG. 3, and shown schematically in FIG. 5. From the second slide and pulley 154, tension member segment 116h extends back to connect to the pedal arm adjuster, shown in positions 100a and 100b in FIG. 5.

The above described tension member linkage path results in the tension member reciprocating back and forth about the first and second sprockets of the rear wheel hub assembly 144 when the two pedal arms are swung arcuately back and forth. The sprockets are provided with one way drive means (sprag clutches, ratchets, cam and roller, etc.) to free wheel in a non-driving direction, and to engage to drive the rear wheel forwardly (clockwise, in the right side views of FIGS. 5 and 6). The specific details of the hub assembly 144 are discussed further below. It will be understood that the left side plate assembly 12 includes a tension member path which is essentially a mirror image of that described above for the right side of the cycle B, with the left tension member wrapping about a third and a fourth sprocket or roller of hub assembly 144.

FIG. 6 schematically illustrates an alternative position for the pedal arm plate assembly, having a position similar to that of the assembly 10b shown in broken lines in FIG. 4 and indicated by the same reference character. In FIG. 6, the first segment 116i of the tension member extends from the pedal arm adjuster 100c (and alternately as segment 116j from the oppositely positioned pedal arm adjuster 100d) and around the pulley or sprocket of the first adjuster slide 114 and continues as tension member segment 116k, passing over or across the sprocket or roller 84. However, due to the angle of the repositioned plate assembly 10b, the tension member segment 116k does not contact the two peripheral rollers 88, but continues essentially directly to the first sprocket or roller of the rear wheel hub assembly 144.

The intermediate portion of the tension member run or path, comprising segments 116l from the hub 144 to the idler pulley 146 and 116m from the pulley 146 back to the hub 144, is essentially identical to the corresponding portion 116e and 116f of the tension member path described for FIG. 5. However, due to the longer run of the remaining return path of the tension member, and the fact that the tension member is of an essentially fixed length, some means must be provided to allow for the longer run portion of the tension member when the plates are repositioned as shown in FIG. 6. The movable idler pulley 146, with its position defined by the forward wrap of the doubled tension member segments 116l and 116m (or 116e and 116f in FIG. 5) and by the tension adjuster spring, 152 or other tensioning means not shown but known in the art, serves to provide the required tension on the tension member 116 regardless of the precise tension member path and orientation of the plate assembly 10. The longer tension member run of FIG. 6 is compensated for by the extended spring 152 and rearwardly repositioned idler pulley 146, in comparison to FIG. 5.

As noted above, the return path of the tension member when the plate assembly 10 is positioned as shown in FIG. 6, is somewhat longer than the return path when the plate assembly is positioned as shown in FIG. 5. Rather than passing directly to the second adjuster slide mechanism 154, the tension member wraps about the second or lowermost of the two peripheral rollers 88, which serves to guide the tension member across the second adjuster mechanism 154. The tension member segment extending from the hub assembly 144 to the second peripheral roller 88 is indicated as segment 116n.

After wrapping about the second roller 88, tension member segment 116o continues to wrap about the second ratio adjuster slide pulley or sprocket 154, in the manner of the corresponding tension adjuster segment 116g of FIG. 5. The remaining segment 116p (or 116q) continues to the corresponding pedal arm adjuster 100d (or 100c), depending upon the corresponding position of the pedal arm 94d or 94c as shown in FIG. 6.

The above described tension member runs serve to provide a reciprocating action of the tension member throughout the runs, including their respective wraps about the sprockets of the rear wheel hub assembly 144. Accordingly, the rear wheel hub assembly 144 includes one way drive means in order to use the reciprocating motions of the tension members of the present mechanism as noted further above. FIG. 7 provides a rear elevation view of the rear wheel hub assembly of the present invention.

The hub assembly 144 of FIG. 7 includes sprocket sets on both the left side 156 and opposite right side 158 thereof, unlike a conventional rear wheel hub having only a single sprocket. Conventional hub attachment means 160 extend to each side 156 and 158 of the hub assembly 144. A wheel hub center 162, with spoke carriers 164 and spokes 166, is disposed between the two ends 156 and 158 of the hub assembly 144. The left side 156 of the hub assembly 144 includes first and second sprockets, respectively 168 and 170, while the opposite hub side 158 includes respective first and second right side sprockets 172 and 174. Pulleys or rollers may be substituted for sprockets when cable tension members are used.

All of the sprockets 168 through 174 are provided with some form of one way drive means, such as conventional ratchet, cam and roller, or sprag clutch arrangements as known in the art of one ways rotary drives. The first sprocket on each side, respectively 168 and 172, provide driving force in the direction of the upward drive arrows D1, with the sprockets 168 and 172 freewheeling without engagement when rotated in a direction opposite the arrows D1. In other words, the left side first sprocket 168 engages to drive the rear wheel when rotated in a counterclockwise direction when viewed from the left side of the cycle, while the right side first sprocket 172 engages to drive the rear wheel when rotated in a clockwise direction when viewed from the right side of the cycle.

The left and right side second sprockets 170 and 174 include one way drive means engaging in the same direction of rotation as the first sprockets 168 and 172, as indicated by the directional arrows D2. Thus, as the tension members wrap about both sprockets on each side of the hub assembly 144, it will be seen that a positive driving force is imparted to the hub assembly 144 regardless of the direction of travel of the pedal arms, as either the first sprockets 168 and 172 are imparting a driving force upon rearward motion of the pedal arms, or the second sprockets 170 and 174 are imparting a driving force upon forward motion of the pedal arms. It will be seen that the. above described. direction of rotation imparted by the sprockets, may be easily reversed by turning the hub 144 (and attached wheel) around, i.e., reversing their left and right sides relative to the frame F, if so desired.

As noted further above, the present mechanism provides for the infinitesimal adjustment of the effective mechanical ratios of both the forward and rearward pedal arms through a predetermined range, thus enabling the rider or operator to select the precise mechanical ratio desired for the given conditions. The forward and rearward mechanical ratios may be adjusted independently of one another, if so desired, to provide different ratios for forward and rearward pedal arm movement.

The mechanism for accomplishing this adjustment was discussed in detail further above, in the portion of the present disclosure, relating to FIGS. 2 and 3 of the drawings. In those Figures, the first and second threaded adjusters 54 and 72, for adjusting respectively the rearward and forward action of the pedal arms, were disclosed, along with an exemplary adjustment slide 114 in FIG. 3. The rotation of the threaded shafts 54 and 72, and also the threaded pedal shaft 96, was described for adjusting the relative positions of the respective adjuster slides 114 and 154 (shown schematically in FIGS. 5 and 6), and 100 therealong.

The resulting selective repositioning of the various slides along their respective threaded shafts produces a corresponding change in the length of the arm of the pedal shaft tension member attachment, as well as the length of the arm (distance) of the first and second adjuster slides from the pedal attachment point on each plate assembly. Accordingly, moving these adjuster slides closer to the pedal attachment point shortens their respective lever arms and results in a greater mechanical advantage, i.e., less force but greater movement of the pedal arms being required to accomplish a given degree of rotation of the rear hub assembly and its attached wheel. Conversely, movement of the various attachment slides outwardly along their respective adjusters lengthens their respective lever arms and results in a lesser mechanical advantage, requiring more force and less movement of the pedal arms for a given degree of rotation of the rear hub and wheel.

Figure 9:
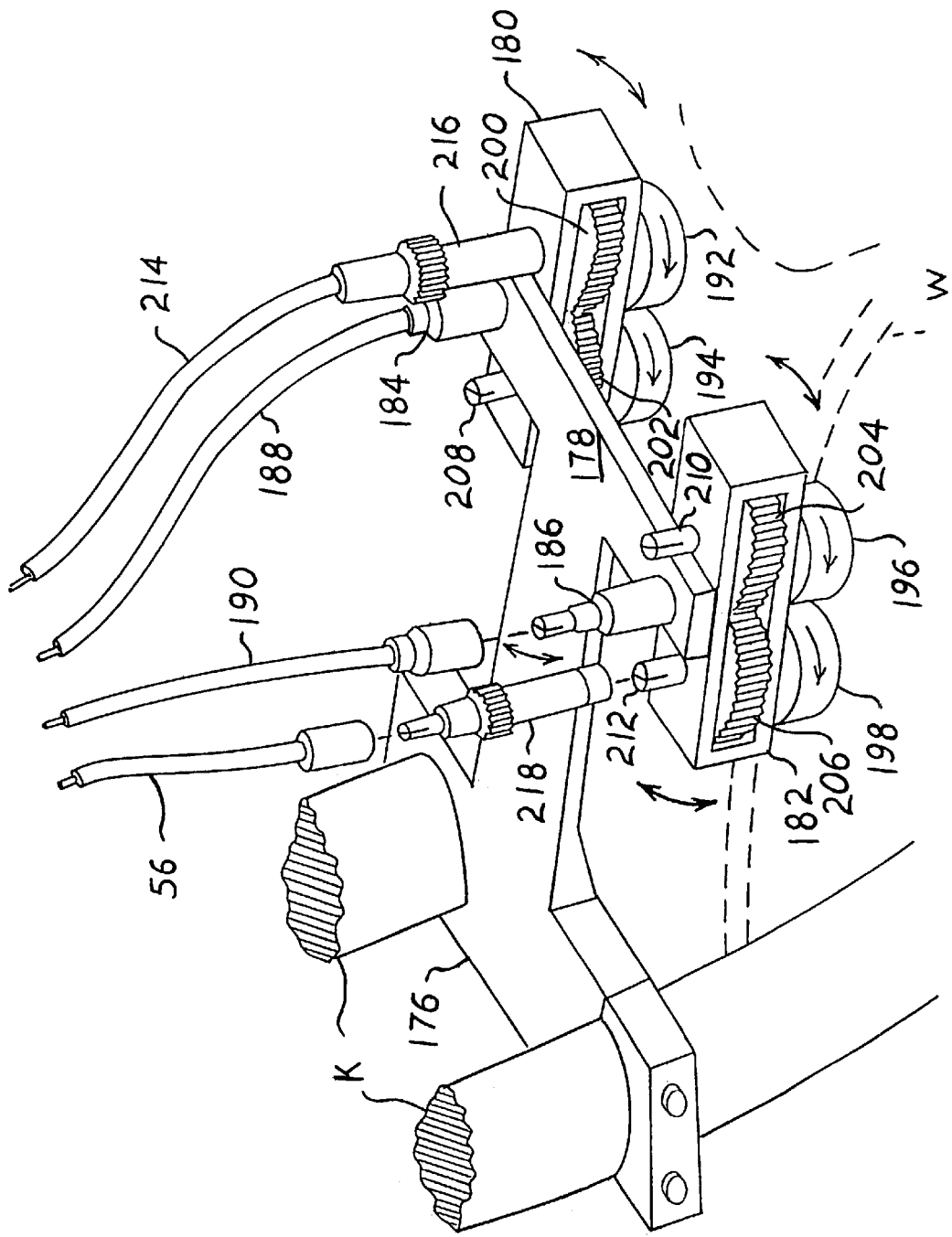
FIG. 9 is a broken away perspective view of the front forks of the bicycle, showing details of the mechanical ratio changing mechanism and its operation and attachment to the bicycle structure.

However, no means was described for imparting rotation to these various threaded shafts (other than the pedal shaft 96, which receives its rotation from the flexible cable and gear train from the first threaded shaft 54.) Accordingly, a disclosure of the means for providing rotational input to the first and second threaded adjuster shafts 54 and 72 (and thus indirectly the pedal arm threaded adjuster shaft 96) is illustrated in FIG. 9 of the drawings. In FIG. 9, an adjuster drive bracket 176 is immovably affixed to the two front forks K of the cycle, immediately above the front wheel FW. The bracket 176 terminates in a relatively wide forward cross-member portion 178, thus defining a generally "T" shaped configuration for the bracket 176. Each arm of the cross-member 178 includes a pivotally mounted adjuster drive wheel carrier, respectively a left carrier 180 and an opposite right carrier 182. The two carriers 180 and 182 each have a rotary drive, respectively 184 and 186, providing for the selective rotation of the carriers 180 and 182 through generally horizontal arcs by means of rotation of the carrier rotation cables, respectively 188 and 190.

Each of the carriers 180 and 182 has a pair of drive wheels extending therefrom, comprising a left forward and left rearward drive wheel 192 and 194 extending from the left carrier 180 and a corresponding right forward and right rearward drive wheel 196 and 198 extending from the right carrier 182. Each of these drive wheels 192 through 198 is selectively engageable with the forward wheel FW, by selectively rotating the corresponding drive wheel carrier 180 and/or 182 by means of their-corresponding cables 188 and/or 190. (Normally, the two carriers 180 and 182 are neutrally positioned, with none of the wheels 192 through 198 engaging and being rotated by the front wheel FW of the cycle. Any one of the drive wheels 192 through 198 is only engaged with the rotating front wheel FW when an adjustment of the corresponding mechanical ratio is desired, as explained further below.)

Each drive wheel 192 through 198 is affixed to a corresponding drive gear, with left front, left rear, right front, and right rear drive gears, respectively 200 through 206, being rotated by their respective drive wheels 192 through 198 to which they are attached. Each pair of drive gears, i.e., left gears 200 and 202, and the corresponding right pair of gears 204 and 206, are intermeshed, so that when one of the gears of a pair is rotated by its attached drive wheel, the opposite gear of the pair rotates in the opposite direction. As only one drive wheel (either the forward or the rearward) of a pair may be engaged with the front wheel FW at any time, the opposite directional turning of the gear of the non-engaged drive wheel, and turning of that drive wheel, is permitted.

Each of the drive gears has a gear shaft extending through a wall of the respective gear carrier, with the left rear, right front, and right rear gear shafts, respectively 208, 210, and 212 shown in FIG. 9. (The left front gear shaft is concealed by the cable fitting connected thereto.) These shafts are selectively connectable to a left or a right side cable drive, respectively 214 and 56; this right side cable drive 56 is the opposite end of the cable drive 56 shown in FIG. 2, connected to the threaded shaft 54 of the first adjuster assembly 50 in that drawing Figure. The left side cable drive 214 selectively drives a corresponding threaded adjuster (not shown, for clarity in the drawings) on the left side plate assembly 12, with the unshown left side adjuster being essentially a mirror image of the right side adjuster shown in FIGS. 2 and 3. A left side and an opposite right side torque limiter, respectively 216 and 218, are installed between the ends of the cables 214 and 56 and the left and right side drive gear shafts, e.g., left shaft 208 and right shafts 210 or 212.

The above described components, including the plate assembly and adjuster mechanisms discussed further above, are actuated to adjust the effective mechanical ratios of the first and second adjuster assemblies and pedal arm adjuster assembly on each of the plate assemblies 12 and 14, as desired. The right side adjuster cable 56 turns the threaded adjuster shaft 54 of the first adjuster 50 (FIG. 3), with the transfer cable 74, gears 76 and 78, and pedal adjuster cable 106 serving to provide rotation to turn the right side pedal arm adjuster shaft 96 as well.

Each adjuster drive cable 56 and 214 drives or rotates a different adjuster assembly on opposite sides of the plate assembly 10. As noted above, the right side adjuster drive cable 56 rotates the threaded adjuster shaft 54 of the first adjuster assembly, thus adjusting the right side first adjuster slide 114 toward or away from the pedal arm pivot point 28 (depending upon the direction or rotation) to adjust the mechanical ratio or advantage of the rearward stroke of the right side pedal arm 94. Simultaneously (assuming the transfer cable to the pedal arm adjuster shaft is connected), the pedal arm adjuster slide 100 is adjusted toward or away from the pedal arm pivot point 28.

The rotation of the right side adjuster drive cable 56 also transfers rotation to the unshown opposite left side first adjuster assembly by means of transfer gears 58 and 60, first transfer shaft 220, and opposite left side first transfer gear 222, all shown in FIG. 2. Rotation of this assembly rotates the opposite threaded actuator shaft of the left side first adjuster assembly, operating in the same manner as the threaded actuator shaft 54 of the right side first actuator assembly 50 to adjustably position the left side first adjuster slide along the adjuster shaft. As the gear ratios of all the first adjuster transfer gears 58, 60, 222, and the unshown left side first adjuster bevel gear corresponding to the right side first adjuster bevel gear 58 are 1:1, the number of rotations of both the right side threaded shaft 54 and opposite left side threaded shaft are the same for any actuation, thus positioning their respective adjusters at the same relative positions.

In a like manner, the left side threaded adjuster also transfers rotational input to the unshown left side pedal adjuster, by means of a mirror image arrangement to the transfer assembly 74 76, 78, and 106 shown in FIG. 3 of the drawings. Again, the gear ratios are preferably 1:1, in order to provide the same number of rotations of both the right side pedal adjuster shaft 96 and its counterpart on the left side of the mechanism.

Actuation of only the right side adjuster drive cable 56 does nothing to change the adjustment of the second threaded adjuster shaft 72, as this shaft 72 and its actuator for adjusting the mechanical ratio of the forward stroke of the pedal arm 94 are controlled by the transfer shaft 64 of the first adjuster assembly 50, by the transfer cable 70. The first adjuster transfer shaft 64 does not rotate with the first adjuster threaded shaft 54. Thus, the adjustment of the rearward stroke of the pedal arms is achieved by rotation of the left and right side first threaded shafts, with separate and independent adjustment of the forward stroke of the pedal arms accomplished by the independent rotation of the threaded left and right side second adjuster shafts by means of their corresponding unthreaded first adjuster transfer shafts and, transfer cables, e.g., the unthreaded t adjuster shaft 64 and transfer cable 70 shown in FIG. 2 for the right side assembly. Rotational motion for the unthreaded first adjuster shafts is provided by the left side drive cable 214 of FIG. 9. (It will be seen that the drive cable 214 could be connected to the right side first adjuster transfer shaft 64, if desired, with the same effect.

With the left side drive cable 214 connected to the unshown unthreaded transfer shaft of the left side first actuator assembly, rotation is transferred to the opposite right side transfer shaft 64 by the left side second transfer bevel gear 224 and shaft 226 to the opposite right side second transfer bevel gear 68, all shown in FIG. 2. As the gear 68 communicates rotationally with the right side first transfer shaft bevel-gear 66, rotation is thus imparted to the right side transfer shaft 64 and thence to the right side threaded second actuator shaft 72 for adjusting the position of the right side second actuator for adjusting the ratio of the forward stroke of the pedal arm 94. Adjustment of the opposite, unshown left side second actuator for adjusting the ratio of the forward stroke of the left pedal arm, is accomplished simultaneously and in essentially the same manner as that described for the right side adjustment of the mechanical ratio for the forward pedal stroke.

The present adjustment system adjusts the first adjusters and the pedal arm adjusters simultaneously, due to the linkage between the threaded first adjuster shafts and pedal arm adjuster shafts described further above and shown in FIGS. 2 and 3. However, the pedal arm adjusters may be adjusted separately from the first adjusters, if so desired. This is achieved by engaging the first adjuster drive cable 56 to position the pedal arm adjusters ask desired, then disconnecting the linkage between the first adjusters and the pedal arm adjusters, e.g., the pedal adjuster cable 106 shown in FIG. 3. The first adjusters may then be adjusted, with the position of the pedal arm adjusters remaining fixed.

The various mechanical ratio adjustments described above are accomplished by means of the cable drive assembly shown in FIG. 9 and discussed further above. When adjustment of the rearward, pedal stroke is desired, the right side rotary drive cable 190 is rotated slightly in the desired direction,.thus rotating the right side adjuster drive wheel carrier 182 to cause either the right side forward drive wheel 196 or right side rearward drive wheel 198 to bear against the tire of the rotating front wheel assembly FW. This produces corresponding rotation of the right side drive wheel 196 or 198, thereby producing rotation of the two right side drivel gears 204 and 206. The rotation of either gear 204 or 206 causes the adjacent gear to rotate, due to the meshing of the two gears 204 and 206. Thus, both of the output shafts 210 and 212 will rotate in opposite directions.

The right side drive cable 56 may be connected to either of the output shafts 210 or 212, depending upon the direction of rotation desired when the right side adjuster drive wheel carrier is rotated in a given direction. The cable 56 in turn imparts the, rotation to the right side threaded shaft 54 of the first adjuster assembly 50, to drive the adjuster 114 upwardly or downwardly along the shaft 54 as desired. The torque limiter 218 is imposed between the end of the cable 56 and the output shaft 210 or 212 in order to preclude damage to the system in the event that the adjuster 114 is run completely to either. of its limits, determined by the end brackets of the adjuster assembly 50 and/or thread limits of the threaded adjuster shaft 54.

As an example of the above adjustment, let us assume that it is desired to increase the pedal effort required per pedal arm stroke, thus providing greater travel of the tension member pert unit of arcuate pedal arm movement. This requires that the first adjuster 114 be repositioned further away from the pedal arm pivot point 28 of the right plate assembly 14. With right hand threaded adjuster shafts, the threaded first adjuster shaft 54 must be rotated in a counterclockwise direction, when viewed from the transfer cable 74 end. Assuming that the right side drive cable 56 is connected to the right rearward drive wheel output shaft 212, in order to turn the cable 56 in a counterclockwise direction, the right side first drive wheel 196 is engaged with the forward wheel FW by rotating the right hand adjuster drive wheel carrier 182 slightly counterclockwise (as viewed from above).

This adjustment of the right side drive wheel carrier 182 is remotely accomplished by the operator by turning the right side rotary drive selector cable 190 slightly in a counterclockwise direction, thereby also twisting the pivotally mounted right adjuster drive wheel carrier assembly 182 counterclockwise. This counterclockwise rotation of the drive wheel carrier 182 engages the right front drive wheel 196 with the front wheel and tire assembly FW, spinning the drive wheel 196 in a clockwise direction as indicated by the directional arrow thereon. This rotational direction is reversed by the gears 204 and 206 to turn the right rear gear shaft 212, and first adjuster drive cable 56, in a counterclockwise direction as viewed from above to turn the threaded adjuster shaft 54 in the proper direction. The left side first adjuster is repositioned simultaneously by means of the transfer gear mechanism described further above and illustrated in FIG. 2 of the drawings.

Adjustment of the first adjuster in the opposite direction, i.e., to reduce the effort required, is accomplished by turning the threaded first adjuster shaft 54 in a clockwise direction (again, as viewed from the transfer cable 74 end) by means of the attached first adjuster drive cable 56. It is not necessary to alter the location of the drive cable 56 to accomplish this; the cable 56 may remain in position on the right side gear shaft, e.g., rearward shaft 212, to which it was previously installed. It is only necessary to turn the right side rotary drive selector cable 190 in the opposite direction from that used to turn the adjuster shaft 54 in a counterclockwise direction, and this is accomplished by twisting or rotating the right side rotary drive selector cable 190 in a clockwise direction, thereby turning the right adjuster drive wheel carrier 182 clockwise to engage the right side rearward drive wheel 198 with the rotating forward wheel and tire assembly FW.

The resulting clockwise rotation of the rearward drive wheel 198 rotates the right side rearward gear 206 and its attached right rear gear shaft 212 in the same direction, i.e., clockwise, as viewed from above. This clockwise rotation is transferred to the first adjuster drive cable 56, to rotate the threaded first adjuster shaft 54 in a clockwise direction as viewed from the transfer cable 74 end.

Adjustment of the second adjusters for adjusting the mechanical ratios of the forward pedal arm strokes, e.g., the threaded shaft 72 of the right side adjuster 52, is remotely accomplished by twisting or turning the left side drive wheel carrier 180 to engage one of the two left side drive wheels 192 or 194 with the rotation of the front wheel assembly FW, and the resulting rotation of the left side rotary drive selector cable 188. As in the case of the first adjusters and their drive from the right side adjuster drive wheel carrier assembly 182, adjustment may be made to either increase or decrease the mechanical advantage or force required of the operator, depending upon which way the left side selector cable 188 is turned, and which of the two left side gear output shafts, e.g., the rearward shaft 208, is used for connecting the left side cable drive 214.

As in the case of the right side adjuster mechanism used for adjusting the first adjusters, the drive cable 214 may be selectively installed on either the left forward gear output shaft (as shown in FIG. 9), or on the left rearward output shaft 208, depending. upon the direction of rotation desired with a given rotational direction of the rotary drive selector cable 188 and resulting rotation of the left side adjuster drive wheel carrier 180. Also, it should again be noted that the two adjuster drive means, i.e., the left side and right side adjuster drives, are completely independent of one another and serve only to adjust the mechanical ratios respectively of the first adjusters (and pedal arm adjusters, if engaged) and of the second adjusters, exclusively.

Figure 10:
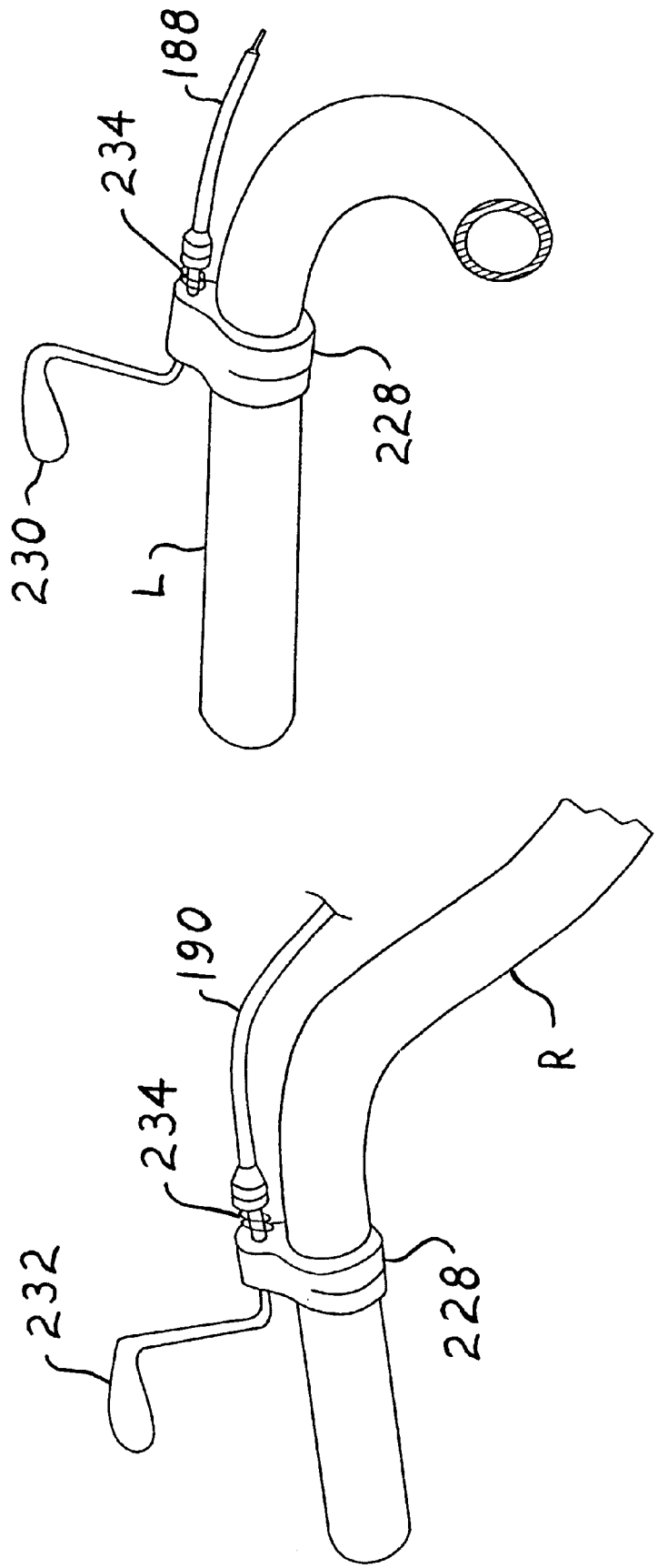
FIG. 10 is a broken away perspective view of the handlebars of the bicycle, showing details of the mechanical ratio changing means attached thereto.

Control of the mechanical ratios of the first and second adjusters (and pedal arm adjusters) is accomplished remotely by the operator, by the left and right side rotary drive selector cables 188 and 190. These two cables 188 and 190 may have input ends which terminate in controls affixed to the handlebars of the cycle for remote operation, as shown in FIG. 10. Each cable 188 and 190 is secured to the respective handlebar L and R by a collar 228, or other suitable means. Adjuster levers, respectively 230 and 232, extend from each drive selector cable 188 and 190. Neutral springs 234 hold the levers 230 and 232 in a neutral position, to hold the drive wheels 192 through 198 clear of the front wheel and tire assembly FW when adjustment of the ratios is not desired.

An operator of a pedal powered device incorporating the present adjustable pedal drive mechanism, may select any mechanical ratio desired within the actuator limits for either the forward or the rearward pedal arm stroke, or both, by manipulating either or both adjuster lever(s) 230 and/or 232 as desired. If the operator wishes to adjust the ratio of the rearward pedal arm stroke, he/she need only manipulate the right lever 232 in the direction desired, e.g., to the left to increase the effort (i.e., higher speed), in accordance with the configuration discussed above. The same applies to the left lever 230 for changing the mechanical ratio of the forward pedal stroke, as desired. It will be seen that the left and right cables 188 and 190 may be exchanged at the left and right levers 230 and 232, if de sired, and/or easily reconfigured to provide opposite directional actuation for a desired action.

It will be seen that the above described mechanism may incorporate various alternative configurations and components to those discussed above, if desired. For example, no guards or the like have been disclosed in the drawing figures, in order to provide clear and unimpeded views of the various functional components of the mechanism. Such guards could be provided over the outer portions of the plate assembly 10, to preclude loose clothing or other articles being caught in the mechanism.

Also, the stops 48 at the ends of the two pedal arm retainers 40 and 42, may be replaced with some resilient means (springs, etc.). This would return any impact energy to the pedal arm, thus easing the work of the operator of the mechanism. The pedal arms may also be spring biased forwardly or rearwardly to alter the force distribution patterns of the pedal strokes, and/or the pedal arms may be bent rearwardly to allow more rearward thrust.

It is also possible to use some other means for changing the mechanical ratios of the mechanism, than the rotary mechanical means disclosed further above. For example, reversible electric motors (not shown) could be installed within the unswept volume (i.e., the volume of the spacer 26) between the two plates 16 and 18, for driving the first and second adjusters 50 and 52. In the event that electrically powered adjustment means is used, then the two levers 230 and 232 (FIG. 10) may be replaced with momentary contact or rotary switches, as desired. Suitable battery power and electrical wiring would also be provided for such electrical adjustment means.

It will be noted that additional mechanical linkages may be included with the above described mechanism, to provide additional variations in the mechanical advantage to the operator and/or to the pedal travel paths. For example, pulleys (not shown) may be installed to the inner side of each of the pedal arms, with the pulleys each having a circumference equal to the arcuate length of their respective lower arcuate edge 34 and 36 of the pedal arm attachment plate assembly 10. The pulleys may be secured to the pedal arms so that their circumferential edges are immediately adjacent to and coplanar with the pedal arm guide track defined by the lower portion of each plate 16 and 18, and its corresponding pedal arm retainer or guide 40 and 42.

A flexible tension member (cable, roller chain, etc., not shown) may be installed to extend from one end of each pedal arm track to wrap around the corresponding pulley and continue to the opposite end of the pedal arm track, with the tension member being tightened to preclude any significant slack therein. Pedals, such as the articulated pedals 236 of the mechanism of FIGS. 1 and 4 through 6, may be installed outboard of each pulley. The above described configuration will be seen to provide a synchronized pulley arrangement, with each pulley producing one complete revolution with each complete stroke of the corresponding pedal arm.

Other arrangements may be constructed, generally based upon the above described alternative. For example, it will be noted that a specific radial line along each pulley will be aligned with its corresponding pedal shaft at each end of the pedal shaft travel, in the above described configuration. An additional shaft (not shown) may be installed at some point along this line on the inner surface of each pulley, with the opposite distal end of each shaft including a slide (not shown) which is captured upon its corresponding pedal arm, with an articulated pedal extending outwardly from the corresponding slide. This arrangement allows the effective rotational action of each of the pedals, to have a radius which is greater than the length of its, pedal arm. The effective pivot point may extend well into the body of the operator of the mechanism, or may be adjusted so that the effective pivot point is between the hip joints of the operator, thus permitting the operator to use relatively stiff legged pedal strokes when the plate assembly 10 has been adjusted to its: lowermost and rearwardmost position, as shown by the assembly 10*a* of FIG. 4.

A further alternative of the above synchronized pulley arrangement, comprises the installation of a secondary shaft (not shown) having a pedal installed thereon, extending from a shaft which is pivotally hinged to the pedal arm. It will be seen that this alternative does not provide a single effective pivot point for the attached pedal, as pedal movement will not be parallel to the axis of the pedal arm.

Yet another alternative comprises the addition of a secondary pedal arm extension pivotally attached or hinged to the primary pedal arm, e.g., pedal arm 94. Rather than securing the ends of the tension member 116 to a slide which is adjustably affixed to the pedal arm, as in the case of the pedal arm adjuster slide 100, pulleys or sprockets (as applicable) may be installed at some intermediate point along the pedal arm to serve as guides for the tension member. The tension member is routed past these guides, to extend to attachment points on the pedal arm extension.

Additional pulleys or sprockets as required may be added to the pedal arm assembly for routing and alignment of the tension members, as required. It will be seen that the pedal arm extension attachment points for the tension member may be provided with adjustability, similar to the threaded pedal arm shaft 96 and its cooperating pedal arm adjuster slide 100, shown in FIG. 3 of the drawings. This arrangement allows the pedals to actually extend to the surface, if so desired. The pedals may be provided with rollers, somewhat like in-line skates, with the rollers being ratcheted to allow the operator to "walk" the surface while seated on the cycle.

In the above configuration, all forces applied to the pedal arm extension are transferred directly to the rear wheel hub assembly 144, by means of the primary tension members routed from the pedal arm extension, around the hub, and back to the extension. This configuration provides a potential variety of motion patterns, including circles, ellipses, radial pumping action at all arcuate positions of the pedal arms, and various combinations thereof.

The above described mechanism is also adaptable for use with a stationary pedal powered device as an exercise machine. FIGS. 11 through 14 show a support stand 250 for supporting a generally conventional bicycle B which has been modified in accordance with the bicycle B of FIGS. 1 through 10. The stand 250 provides for the rigid and stationary securing of the cycle B frame therein, and also provides for rotation of both the rear wheel RW and, through appropriate linkage, the front wheel FW for driving the mechanical ratio adjusting means discussed further above. Braking means is also provided for the rear wheel RW, to increase the effort required of a person using the present exercise device comprising the bicycle B, its adjustable pedal mechanisms (not shown in FIG. 11, but essentially identical to the mechanism discussed above and illustrated in FIGS. 1 through 10), and the associated stand 250.

The stand 250 includes an elongate base channel 252 containing the various adjustable and operational components thereof. The channel 252 is braced laterally by a support structure having a base with opposite left and right extensions, respectively 254 and 256, and opposite left and right side support members, respectively 258 and 260, extending upwardly from the extensions 254 and 256. A crossmember 262 extends between the two upright support members 258 and 260 and passes through the pedal shaft or other sleeve or bushing S of the bicycle B, to affix the cycle B upright securely within the stand 250. The support structure is secured to the channel 252 by threaded fasteners 264 passing through the support members 258 and 260 and the channel 252 sides, or other suitable means.

The rearward portion of the elongate, longitudinal base channel 252 includes a first rearward wheel channel 266 adjustably disposed therein, with the channel 266 having a first rearward wheel roller 268 disposed therein. A second rearward wheel channel 270 is adjustably disposed within the first rearward wheel channel 266, and contains a second rearward wheel roller 272 therein. In a similar manner, the opposite forward end of the channel 252 has a first forward wheel channel 274 installed therein, with the channel 274 including a first forward wheel roller 276. A second forward wheel channel 278 is installed within the first forward channel 274, with the second forward channel including a second forward wheel roller 280.

All of the rollers 268, 272, 276, and 280 lie in the same plane, in order that the front and rear wheels FW and RW of a cycle B resting thereon, will be in a straight line. The first rearward and first forward channels 266 and 274 are adjustably positionable within the elongate base channel member 252, for adjusting the stand 250 for cycles having different wheelbase lengths. Also, the second rearward and second forward wheel channels 270 and 278 are slidably positionable within their respective first channels 266 and 274. This allows the second rearward and second forward rollers 272 and 280 to be adjustably positioned nearer to or farther from their respective first rearward and first forward rollers 268 and 276, for providing adjustment for different cycles having different front and/or rear wheel and tire diameters from one another.

Figure 12:
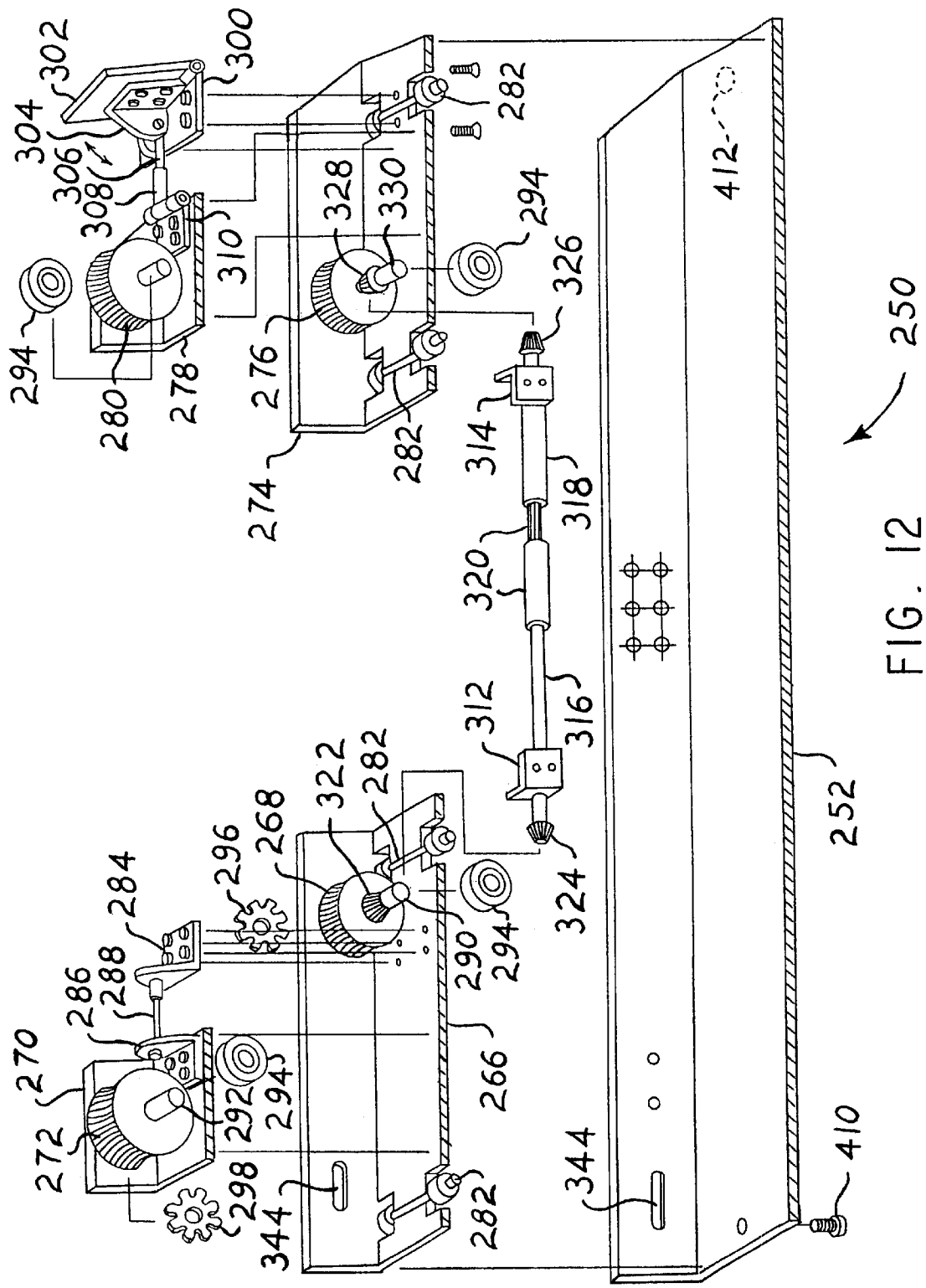
FIG. 12 is an exploded perspective view of the stand of FIG. 11, showing details of the various components thereof and their relationships.

FIG. 12 provides an exploded perspective view in section of the stand 250, illustrating various details of the multiple adjustment means incorporated therein and noted above. In FIG. 12, the right walls of each of the channel components 252, 266, 270, 274, and 278 are removed, in order to show more clearly the various mechanisms therein. As noted above, the first forward and rearward channels 266 and 274 are adjustably positionable within the base channel 252. Each of these channels 266 and 274 includes a forward and a rearward wheel and axle assembly 282, to allow the channels 266 and 274 to move smoothly within the base channel 252 when adjustment is required. No means is provided for securing the first forward and first rearward channels 266 and 274 within the base channel 252, as these two channels 266 and 274 must be able to "float" longitudinally within the base channel 252 to accommodate different cycles of differing wheelbases and dimensions.

However, means are provided for locking the position of the second channels 270 and 278 within their respective first channels 266 and 274. The second rear wheel channel 270 and its roller 272 are adjustably affixed within the first rear wheel channel 266, by means of a cooperating bracket and threaded rod arrangement. The first rear wheel channel 266 includes a bracket 284 installed therein, and facing the second rear wheel channel 270. The second rear wheel channel 270 includes a similar bracket 286, facing the first rear wheel channel bracket 284. An adjustably threaded link or rod 288 is installed between the two, permitting the two channels 266 and 270 to be adjustably locked relative to one another.

Each rear wheel roller 268 and 272 rotates on a lateral shaft, respectively 290 and 292. The shafts 290 and 292, as well as the forward roller shafts discussed further below, are supported by ball bearings 294, or other suitable means. First and second rear roller sprockets, respectively 296 and 298, are installed upon the two shafts 290 and 292 and are connected by a conventional roller chain (not shown, for clarity in the drawing Figure). The length of the roller chain may be adjusted by adding or removing links in accordance with the adjustment of the threaded link 288 between the first rear channel bracket 284 and second rear channel bracket 286, or an idler pulley or the like may be provided if so desired. This insures that both rear wheel rollers 268 and 272 rotate at the same speed at all times, regardless of any differences in frictional resistance upon either of them which might affect their individual rotational speeds, as due to the mechanisms described below.

A torque transfer mechanism is provided between the first rear wheel roller 268 and the first forward wheel roller 276. A braking system is also provided which acts upon rotational input from the second rear wheel roller 272 from the rear tire and wheel RW of the cycle B. These mechanisms are discussed in detail further below. The result of these two mechanisms is that the resistance (and thus slippage) of either of the rear wheel rollers 268 and 272 may be unequal, under different circumstances (greater brake drag, etc.). Tying the two rear wheel rollers 268 and 272 together rotationally insures that they will consistently rotate at the same rotational velocity at all times, regardless of differential forces thereon.

The positional locking means for securing the second forward wheel roller channel 278 within the first forward wheel roller channel 274 comprises a hinged assembly having a first leaf or plate 300. which is affixed to the forward end of the first forward wheel roller channel 274. The second leaf or plate 302 is hinged to the first plate 300 and includes a bracket 304 extending rearwardly therefrom, with a first threaded rod link 306 pivotally secured thereto and extending rearwardly from the bracket 304. A mating threaded link 308 is pivotally secured to a plate 310 affixed to the forward edge of the second forward wheel channel 278.

The threaded links 306 and 308 are adjusted as desired to provide the proper positioning for the second forward wheel channel 278 within the first forward wheel channel 274. Once the linkage 306 and 308 has been adjusted as desired, the movable second plate or leaf 302 is folded rearwardly and downwardly to lie adjacent the forward end of the first wheel channel 274, thus pushing the links 306 and 308 and their pivotal attachment point with the bracket 304 over center. This attachment point essentially rests upon the bottom surface of the first forward wheel channel 274, slightly below a line extending between the hinged attachment line of the first plate or leaf 300 with the second plate or leaf 302, and the attachment point of the second link 308 with the plate 310 affixed to the second forward wheel channel 278. The mechanism is released by lifting the second plate 302 to release the over center position of the linkage.

The stand 250 is particularly well adapted for use with a cycle B having the adjustable pedal mechanism of FIGS. 1 through 10, and described in detail further above. That mechanism provides powered means for adjusting the effective mechanical ratios for the forward and rearward strokes of the pedal arms, by means of rotational input selectively transferred from the rotating front wheel and tire of the cycle while it is in motion. Accordingly, if this means of adjusting the effective mechanical ratio of the pedal assembly is to be used while the cycle B is affixed within the stand 250, as shown generally in FIG. 11 of the drawings, some mean must be provided to transfer rotary motion from the driven rear wheel of the cycle to the normally non-driven front wheel.

The two forward rollers 276 and 280 permit the rotation of the front wheel of the cycle when it is secured within the stand 250. An additional rotary linkage extends between the first rear wheel roller 268 and the first forward roller 276, as shown in FIG. 12. This linkage is secured to one wall of the first rearward wheel channel 266 by a first bracket 312, and to a-corresponding wall of the first forward wheel channel 274 by a second bracket 314. (The walls are broken away in FIG. 12 for clarity in the drawing, but their edges are visible in FIG. 11.) A first rotary shaft segment 316 extends forwardly from the first bracket 312, and a second rotary shaft segment 318 extends rearwardly from the second bracket 314. The two shaft segments 316 and 318 are slidably connected by a mating externally and internally splined sections 320, which locks the shaft segments 316 and 318 rotationally together.

The axle or shaft 290 of the first rearward wheel roller 268 includes a first bevel gear 322, which engages with a mating second bevel gear 324 disposed at the rearward end of the first shaft segment 316, rearwardly of the first bracket 312. The opposite forward end of the second rotary shaft segment 318 includes a third bevel gear 326, which engages a mating fourth bevel gear 328 affixed to the axle or shaft 330 of the first forward wheel roller 276. This arrangement transfers rotary motion from the rear wheel RW of the cycle B through the first rear wheel roller 268 to the first rotary shaft segment 316 by means of the first and second bevel gears 322 and 324, through the splined section 320 of the two shaft segments 316 and 318 to the third and fourth bevel gears 326 and 328 to the first front wheel axle 330 and its roller 276, thence to the front wheel FW of the cycle B.

The above described means of providing rotation for a cycle front wheel, permits the rotating front wheel FW to power the adjustment of the variable mechanical ratios of the pedal arms, which mechanism is shown particularly in FIGS. 2, 3, and 9 of the drawings. As noted further above, other means of powering the threaded adjuster shafts of the adjustment means may be provided if so desired, e.g., electric motors. If some alternative means is provided for rotating the adjuster shafts, then the above described means of transferring rotational motion to the front wheel of the cycle is not required. However, front wheel rotation provides other benefits, i.e. the visual and inertial effects of both wheels rotating more closely simulate those of a real bicycle ride.

Figure 13:
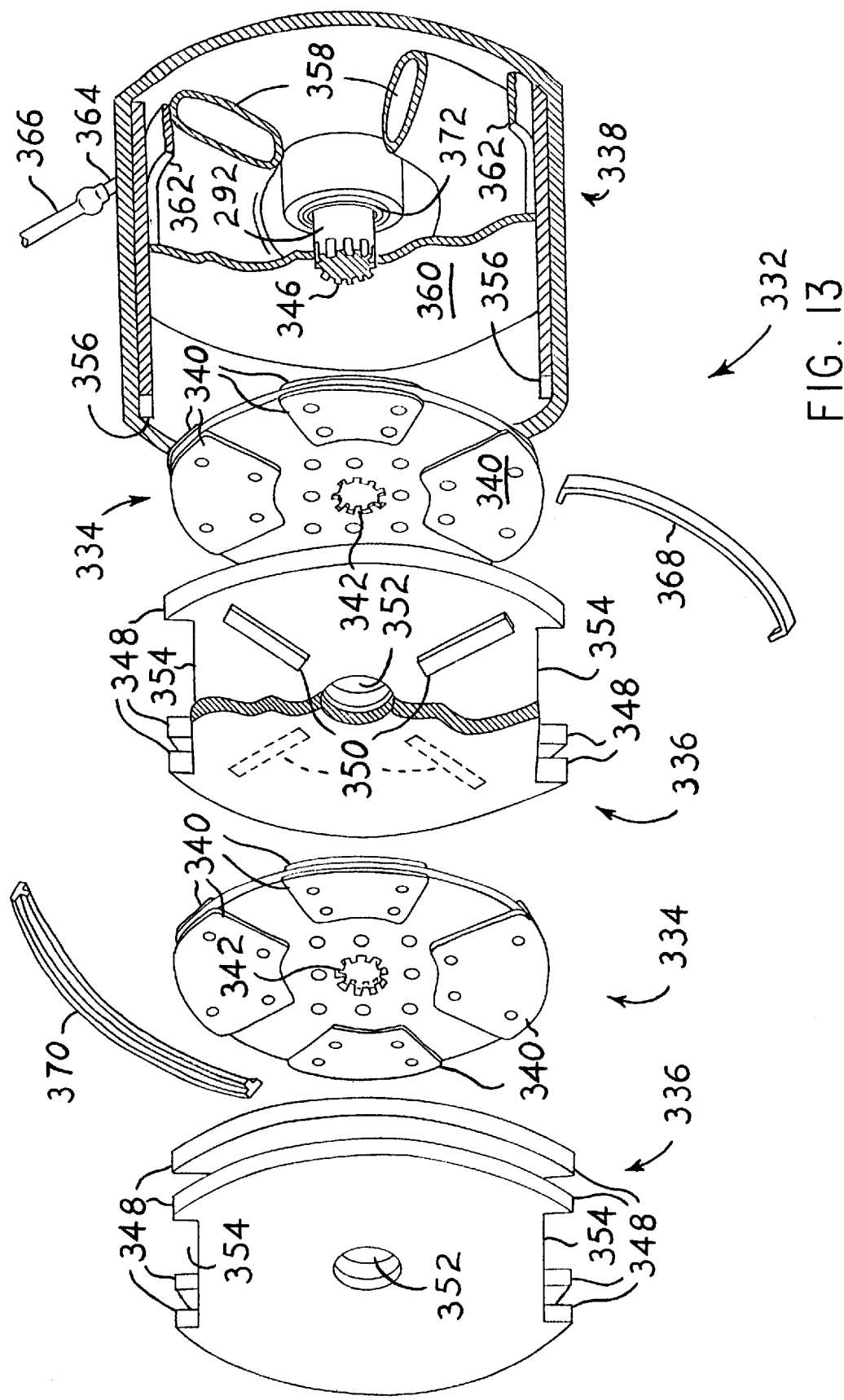
FIG. 13 is an exploded perspective view, partially broken away, of one side of the drag brake assembly used for imparting resistance to rotation to the mechanism of the stationary stand.

As noted further above, the present stand 250 is particularly well adapted for use in supporting a bicycle, particularly the cycle B equipped with the adjustable pedal drive mechanism illustrated in FIGS. 1 through 10, for use as an exercise device. Accordingly, brake means are provided for increasing the rotational resistance of the rear wheel of the cycle when it is installed in the stand 250. FIG. 13 provides an exploded perspective view in section of a brake assembly 332 for use with the present stand 250.

Figure 11:
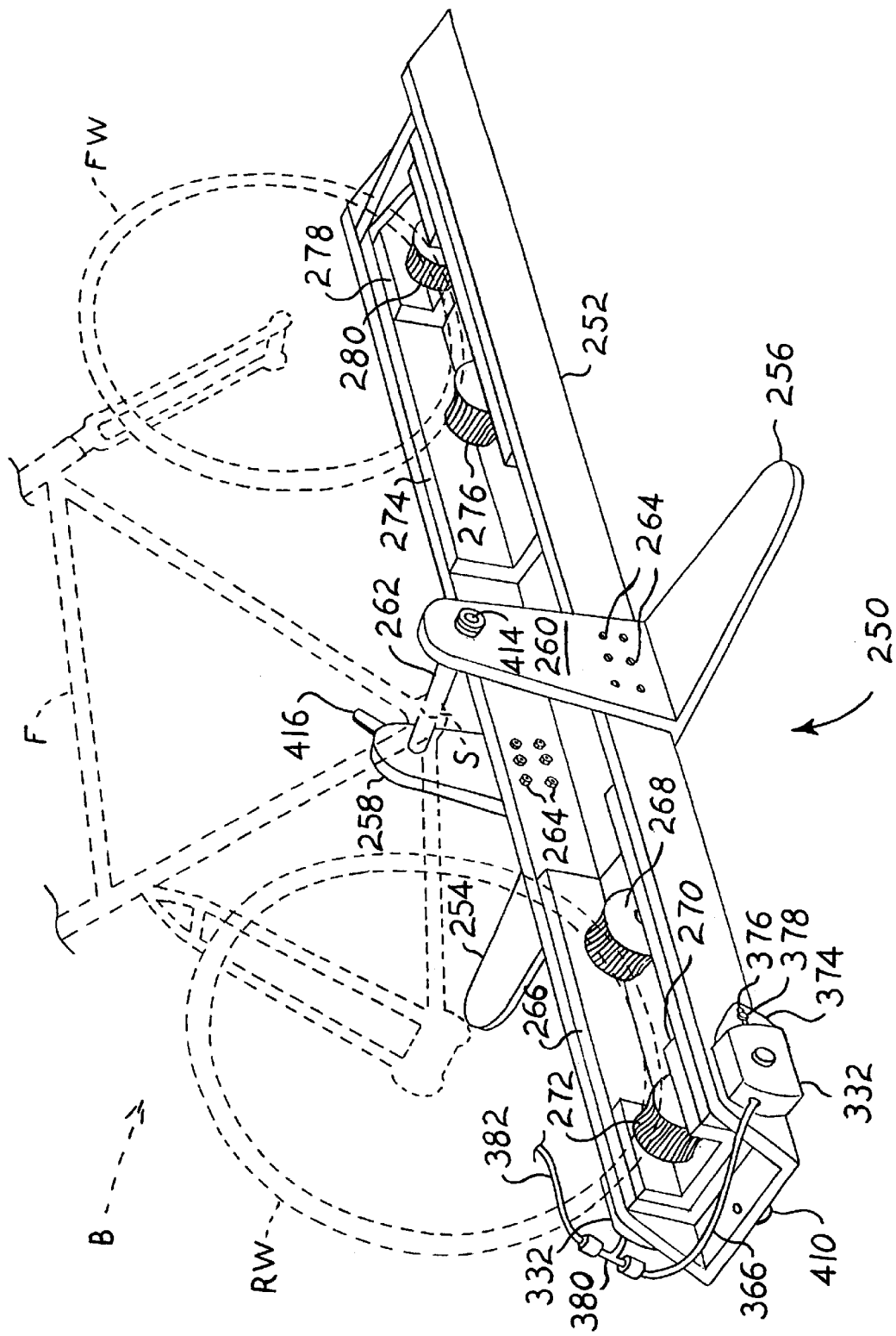
FIG. 11 is a right side perspective view of an alternate embodiment of the present invention, illustrating a stationary stand providing for a bicycle equipped with the present mechanism to be used as a stationary exercise bike.

The brake assembly 332 generally comprises a multiple disc brake system, having one or more (preferably a plurality of) rotors 334 and stators 336 in alternating juxtaposition with one another. A case 338 encloses the rotors 334, stators 336, and other components described below and shown in FIG. 13. While only a single brake assembly 332 is shown in FIG. 13, it will be seen that the stand 250 preferably incorporates two such systems with each being a mirror image of the other, as shown in FIG. 11.

The rotors 334 are generally circular plates with friction material or pads 340 disposed to each side or surface thereof. A splined central passage 342 is formed through the center of each rotor 334. The outer ends of the shaft or axle 292 of the second rear wheel roller 272 extend outwardly through slots 344 formed through the sides of the first rear wheel channel 266 and base channel 252 (FIG. 12), and terminate in splined ends 346 which engage the splined passages 342 of the rotors 334. The channel slots 344 allow forward and rearward adjustment of the first and second rear wheel channels 266 and 270 within the base channel 252.

The stators 336 are vented units, each formed of a pair of plates 348 which are spaced apart by a plurality of spacers 350 disposed therebetween. Each stator 336 includes a relatively large central passage 352 therethrough, providing clearance for the splines 346 of the axle or shaft 292 to preclude engagement therewith. Each stator 336 also has a flat depression 354 formed in opposite edges thereof, which engage mating flat plates 356 disposed within opposite sides of the housing or case 338, thus precluding rotation of the stators 336 within the case 338.

A generally toroidal expander tube 358 is installed in one end of the case 338, with the tube 358 applying axial pressure to a first stator plate 360 which then transfers braking pressure to the rotors 334 and stators 336 to force them together when the tube 358 is expanded. An outer protective band 362 surrounds the tube 358 within the case 332. The expander tube 358 may be inflated using any suitable fluid (hydraulic, pneumatic, etc.) by a valve stem 364 extending from the outside of the tube 358, through the protective band 362, and through the outer wall of the case 332, where an inflation tube 366 is connected to the stem 364. While hydraulic fluid may be used for actuation of the above described disc brake assembly 332, preferably a pneumatic system is used, with air pressure being applied by a controllable device operated by the operator of the bicycle B installed upon the present stand 250, a discussed further below. Alternatively, resistance may be provided by electrical generators, for converting mechanical energy to electrical energy which is then used or dissipated.

As the present brake assembly 332 is actuated, air captured between the brake pads 340 of the rotors 334 and the adjacent plates 348 of the stators 336, will be forced centrifugally from this space. This airflow then attempts to flow to the area between the two plates 348 of each stator 336, thus precluding an outward flow of warmed air from this area. Alternating air control strips are accordingly provided for precluding undesirable airflow between the rotors 334 and stators 336 of the present brake mechanism 332.

The first type of strip is a generally semicircular spring band 368, which is clipped into position across opposing plates 348 of adjacent stators 336 to bridge the gap occupied by the rotor 334 installed therebetween. Adjacent stators 336 are still free to move toward and away from one another during braking action, as their peripheries may move slightly beneath the spring bands 368. These spring band strips 368 serve to preclude air expelled from the centrifugal action of the rotors 334 from entering the space or gap between the plates 348 of the stators 336.

The second type of strip is a generally semicircular resilient strip 370 with a generally T-shaped cross section. These resilient strips 370 are pressed into place between the plates 348 of each of the stators 336, to preclude air expelled from the rotors 334 from flowing into the vent space between the plates 348 of each of the stators 336. While only a single one of each type of air seal strip 368 and 370 is shown, it should be noted that a plurality of these strips are placed alternatingly across each space between adjacent stators 336 and stator vents, on opposite sides of the brake assembly.

The above described brake assembly 332 is installed on the base channel 252 of the stand 250, by passing the extended spline end 346 of the second rear roller axle shaft 292 through the inner bearing 372 (FIG. 13) of the brake assembly housing 338, to engage the mating internally splined passages 342 of each of the rotors 334. Preferably, two such mirror image assemblies 332 are installed on opposite sides of the base channel 252, as shown in FIG. 11. The housing 338 includes an extended ear or lug 374 (FIG. 11) which is used to index the brake assembly 332 to the base channel 252 and to preclude rotation of the brake assembly 332 relative to the remainder of the stand 250 due to torque when the brake assembly 332 is activated. The lug 374 includes a longitudinal slot 376 formed therein, with the slot 376 engaging an index block which protrudes outwardly from the base channel 252. A retaining bolt 378 is secured to the block, to preclude lateral movement of the brake assembly 332 from the base channel 252.

As noted further above, the brake assembly or assemblies 332 of the present stand 250 are preferably pneumatically actuated. The actuation line or inflation tube 366 may be routed to a remote actuation means, discussed further below. Where two such brake assemblies 332 are installed on the stand 250, the second assembly 332 may be connected to its opposite member by means of a tee fitting 380 in the line 366, with a single line 382 continuing to the actuation means.

Figure 14:
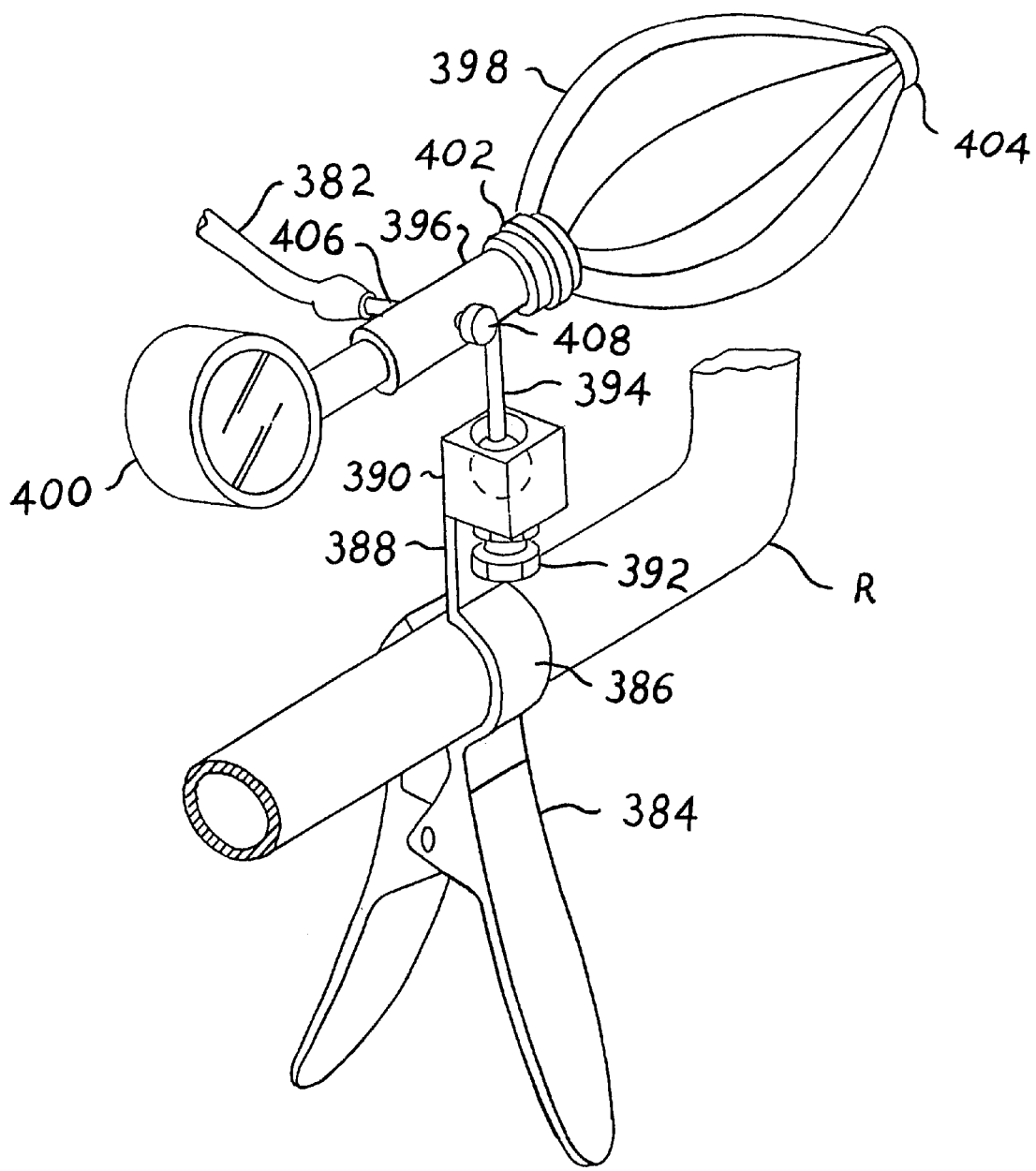
FIG. 14 is a broken away perspective view of one side of the handlebars of the bicycle used with the stationary stand, showing the pneumatic means for adjusting the drag of the brake assembly of FIG. 13.

FIG. 14 illustrates a generally forward looking perspective view of the brake actuation mechanism of the present invention, removably secured to the right handlebar R of the cycle. (It will be seen that the removable attachment clamp 384 may be secured to either side of the handlebar assembly as desired, or to some other convenient location as desired.) The clamp 384 includes a jaw portion 386 formed to secure about the handlebar portion of the cycle, with an extension portion 388 extending from one of the jaws of the jaw portion 386. The extension 388 supports a pneumatic actuation assembly by means of a suitable support, such as the angularly adjustable ball and socket fitting 390 shown. A threaded locking knob 392 may be provided for the fitting 390, to tighten against the ball therein for locking the assembly in position as desired. A support rod 394 extends from the fitting 390, to support a pneumatic actuation body 396.

The body 396 may comprise a generally tubular structure having a manually actuated pneumatic squeeze-type bulb 398 sealed to one end thereof, with a pressure gauge 400 installed in the opposite end thereof. The gauge 400 may be calibrated in units of pressure. Alternatively, since the pressure in the system is proportional to the brake drag produced, the gauge 400 may be calibrated in units of drag force, or perhaps in degrees or percentage of a slope to indicate the virtual steepness of a slope simulated by the increased brake drag.

The body portion 396, or the juncture 402 of the bulb 398 with the body 396, includes a conventional one way check valve means (e.g., butterfly valve, ball check valve, etc.) in order to preclude airflow back into and through the bulb 398. The bulb 398 includes an air inlet and additional check valve means 404 opposite its connection 402 with the body portion 396. Air pressure pumped into the body portion 396 is retained in the system by the check valve means noted above, and is passed to the brake line 382 and thence to the brake assemblies 332 installed on the base channel 252 by means of a nipple or fitting 406 extending from the body portion 396. Excessive pressure in the system may be adjusted by means of a release valve 408 installed in the body portion 396.

The pneumatic brake actuation system is used by the operator of the cycle B mounted on the stand 250, selectively increasing the pressure in the brake system by pumping the pneumatic bulb 398 until the desired braking resistance is achieved. Alternatively, the operator may increase pressure in the system until a desired indication is reached on the gauge 400 (pressure, braking resistance, simulated grade or slope, etc.). Any excessive pressure may be adjusted or released by means of the release valve 408 provided in the body portion 396 of the assembly. As noted further above, alternative braking means may be provided, e.g., electrical generation, with control of the field coils by a remotely located controller for access by the operator, or hydraulic means, etc., as desired. Conventional heat dissipation means may be provided for any of the alternative braking systems.

The above described stand 250, with its means for supporting the cycle,B, providing for adjustment of the mechanical ratios of the cycle B by the operator, and for increasing the workload of the operator by means of the braking system described above, is of great value for a person desiring an accurate simulation of cycling while indoors. The stand 250 is easily readied for installation of the cycle B, by leveling the stand 250 as required by means of the threaded adjustment 410 (FIGS. 11 and 12) and installing the cycle B therein. (A fixed pad 412, shown in FIG. 12, may be provided at the opposite end of the base channel 252, and similar leveling means, not shown, may be provided at each end of the left and right base extensions 254 and 256.)

The cycle B is then placed within the stand 250, and the first forward and rearward channels 266 and 274 and second forward and rearward channels 278 and 270 are adjusted for the wheelbase of the cycle B, if they have not been previously adjusted, in order to position their respective rollers 268, 276, 272, and 280 properly for the wheel diameter and wheelbase of the cycle B. The pedal shaft bushing crossmember 262 is then passed through the left upright 258 and the otherwise empty pedal shaft bushing sleeve S of the cycle (the conventional pedal assembly having been previously removed, with installation of the adjustable pedal drive mechanism discussed further above and shown in FIGS. 1 through 10). Alternatively, it will be seen that a separate or different lateral passage, sleeve, or bushing (not shown) may be provided specifically for the installation of the crossmember 262 in lieu of using the conventional lateral pedal shaft bushing, if so desired. The crossmember 262 is threaded at one end thereof, and engages a mating threaded insert 414 captured in the upright 260 of the base channel 252, as shown in FIG. 11. A lever 416 is then used to secure the assembly.

The cycle B and stand 250 may then be used for stationary cycling exercise by the operator thereof. If a selectively variable workload is desired by means of selectively braking the operation of the rear wheel and tire RW of the cycle B, the operator need only clamp the brake control assembly discussed above to one of the handlebars of the cycle, and connect the associated tubing 382 to the brake assembly or assemblies 332 installed at the rear of the stand 250. The operator may then adjust the braking resistance as desired, while monitoring the gauge 400 to determine the resistance or equivalent slope, etc. of the system. When the exercise is completed, the cycle B is easily removed from the stand 250 by removing the brake control assembly, unlocking the hinged second plate 302 of the forward locking assembly, and removing the crossmember pin 262, thereby readying the cycle B for actual cycling activities.

In summary, the present adjustable pedal drive mechanism for bicycles and other pedal powered devices, provides an advanced means of pedal operation for such devices. The arcuately reciprocating forward and upward, and rearward and downward, strokes of the pedal arms are much more efficient than the conventional circular pedal motions of conventional mechanisms. The provision for adjusting the limits of the swing of the pedal arms as desired provides the operator with further versatility. Moreover, the operator of the device may select precisely the mechanical ratio desired for the forward stroke, rearward stroke, and pedal arm independently of one another, as desired. The advantages of such a system are readily apparent for the cyclist who cycles over relatively long distances and/or variable terrain.

In addition, the above described stand for securing a cycle equipped with the present adjustable pedal mechanism, enables a cyclist to enjoy all of the benefits of an actual cycle ride while remaining stationary. The stand provides for rotation of both rear drive wheel and front wheel of the cycle mounted therein, thereby providing more realistic visual effects and inertial feel for the cyclist, as well as enabling the adjustable mechanical ratios of the pedal drive mechanism to be adjusted by means of the rotational movement of the front wheel of the cycle. Thus, the present stand enables a cyclist to enjoy all of the effects of an actual cycle ride, while the cycle is mounted in the stand for use as a stationary exercise machine. Yet, the cycle is easily installable in and removable from the stand in only a very few seconds, thus enabling the cyclist to easily convert the cycle for outdoor use or stationary use as desired. The benefits of the present system incorporating a cycle equipped with the present variable pedal drive mechanism and stand therefor, will be of great value to any serious cyclists who wish to enjoy their activity under all circumstances.

It is to be understood that the present invention is not limited to the embodiments described above, but encompasses any and all embodiments within the scope of the following claims.

I claim:

1. A pedal driven device comprising:

a generally trapezoidal frame with a diagonal frame member;

at least one forward wheel mounted between a pair of front forks;

at least one rearward drive wheel;

a left and an opposite right handlebar communicating with said at least one forward wheel; and an adjustable pedal drive mechanism including:

a lateral pedal arm plate bushing affixed across said diagonal frame member;

a left side and an opposite right side pedal arm plate assembly affixed to one another and pivotally secured to said frame through said pedal arm plate bushing, each said plate assembly including a pedal arm attachment point, and a separate bushing attachment point for pivotally securing each said plate assembly to said pedal arm plate bushing of said frame;

a left and an opposite right pedal arm, pivotally attached to said pedal arm attachment point respectively of said left and said right plate assembly and having a reciprocating arcuate travel path relative thereto comprising a generally forward and opposite rearward stroke;

a rear wheel hub having a left and a right side;

a first and a second one way drive means disposed to each said side of said rear wheel hub, with each said first and said second one way drive means accepting rotary force and engaging with said rearward drive wheel in a first direction of rotation, and rotating freely and disengaging from said drive wheel in a second direction of rotation opposite said first direction of rotation; and a left and an opposite right tension member respectively extending from said left and said right pedal arm and generally across each corresponding said plate assembly to the respective said first one way drive means, and incorporating tensioning means for each said tension member and returning to the respective said second one way drive means, thence returning to said corresponding said plate assembly, for transmitting power from each said pedal arm to said rear wheel hub during said forward and said rearward stroke of each said pedal arm.

2. The pedal driven device according to claim 1, including means for angularly adjusting said arcuate travel path of each said pedal arm and adjustably repositioning said pedal arm attachment point of each said plate assembly relative to said frame.

3. The pedal driven device according to claim 1, including means for infinitesimally adjusting the effective mechanical ratio of said forward stroke of each said pedal arm through a predetermined range.

4. The pedal driven device according to claim 1, including means for infinitesimally adjusting the effective mechanical ratio of said rearward stroke of each said pedal arm through a predetermined range.

5. The pedal driven device according to claim 1, including means for infinitesimally adjusting the effective mechanical ratio of said forward and said rearward stroke of each said pedal arm through predetermined ranges, independently of one another.

6. The pedal driven device according to claim 1, including powered means for infinitesimally adjusting the effective mechanical ratio of said forward and said rearward stroke of each said pedal arm through predetermined ranges, with said powered means being powered by rotation of said forward wheel.

7. The pedal driven device according to claim 6, including means for remotely controlling said powered ratio adjusting means from said pedal driven device during operation thereof.

8. The pedal driven device according to claim 1, including means for automatically adjusting each said tension member for compensating for changes in the travel path thereof.

9. The pedal driven device according to claim 1, wherein each said tension member is selected from the group consisting of roller chains and flexible cables.

10. The pedal driven device according to claim 1, including a stand for supporting said pedal driven device and for using said pedal driven device as a stationary exercise machine.

11. The pedal driven device according to claim 10, wherein said stand includes means for transferring rotational motion from said rearward drive wheel to said forward wheel.

12. The pedal driven device according to claim 10, wherein said stand includes means for adjusting for different pedal driven devices having different dimensions from one another.

13. The pedal driven device according to claim 10, wherein said stand includes means for selectively increasing rotational resistance for at least said rearward wheel.

* * * * *